United States Patent [19]

Pettigrew et al.

[11] Patent Number: 4,486,870
[45] Date of Patent: Dec. 4, 1984

[54] OPTICAL DATA STORAGE

[76] Inventors: Robert M. Pettigrew, Pound Cottage, High St., Foxton, Cambridgeshire; John D. Bradbrook, 56, Downlands, Royston, Hertfordshire; Ronald C. Wainwright, Chauffeurs Cottage, Aston La., Bragbury End, Stevenage, Hertfordshire, all of England

[21] Appl. No.: 399,862

[22] Filed: Jul. 19, 1982

Related U.S. Application Data

[63] Continuation-in-part of Ser. No. 227,274, Jan. 22, 1981.

[30] Foreign Application Priority Data

Jul. 23, 1981 [GB] United Kingdom ............... 8122737

[51] Int. Cl.³ ..................... G11B 7/00; G03B 23/00
[52] U.S. Cl. ..................... 369/32; 353/27 A; 364/518; 369/44; 369/109; 369/111; 369/125; 369/275
[58] Field of Search ............... 369/30, 32, 33, 41, 369/47, 100, 103, 109, 125; 358/332, 342, 345; 355/53, 64, 65; 354/7; 353/26 A, 27 A, 27 R; 364/200, 900, 518; 365/124, 125, 126

[56] References Cited

U.S. PATENT DOCUMENTS

| | | | |
|---|---|---|---|
| 2,283,545 | 5/1942 | Eckert, Jr. | 369/109 |
| 3,351,920 | 11/1967 | Harper et al. | 365/126 |
| 3,689,692 | 9/1972 | Chung-Sen Ih | 369/109 |
| 3,715,524 | 2/1973 | Adler | 358/342 X |
| 4,142,209 | 2/1979 | Hedlund et al. | 358/342 X |
| 4,179,743 | 12/1979 | Suzuki et al. | 353/27 A |

Primary Examiner—Donald E. McElheny, Jr.

[57] ABSTRACT

A thermoplastics data storage member carries information which can be imaged using non-coherent light and, in addition to and distinct from that information, control data which defines a two-coordinate system for the member which controls random access to the information. A reading apparatus comprises a non-laser optical system for imaging selected areas of the information and a servo-system, including a microprocessor and transducers for reading the control data, for positioning a reading head of the optical system in desired locations relative to the storage member. The invention affords cheap optical data bases readable by apparatus not requiring a laser optical system.

52 Claims, 19 Drawing Figures

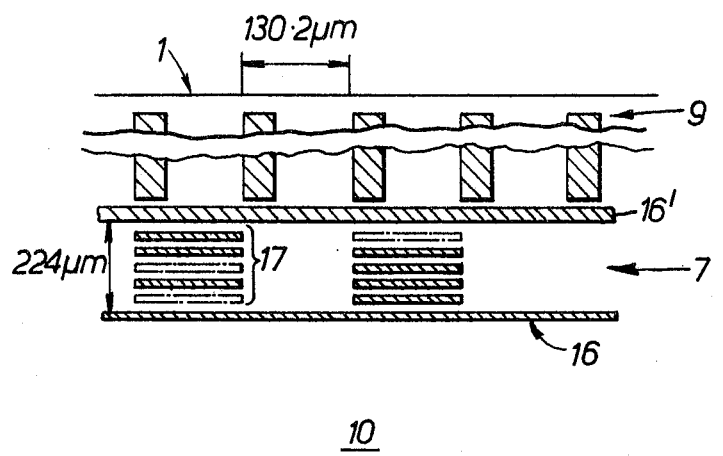
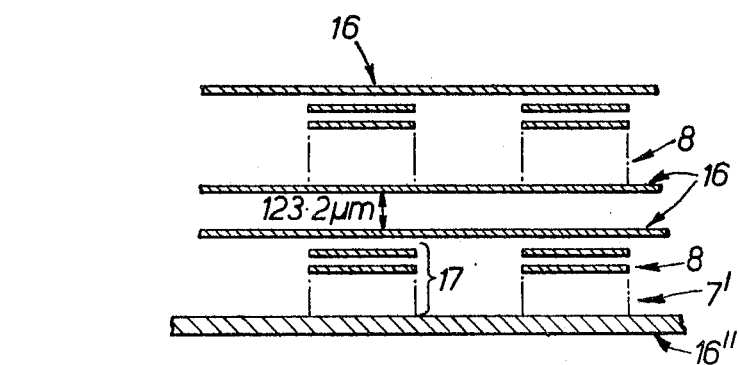
FIG. 18.

OPTICAL DATA STORAGE

CROSS-REFERENCE TO RELATED APPLICATION

This patent application is a continuation-in-part of U.S. patent application Ser. No. 227,274 filed Jan. 22, 1981.

BACKGROUND OF THE INVENTION

The present invention relates to optical data storage systems, optical data storage members and is particularly applicable to data bases. The invention is also applicable to optical data recording systems as disclosed in PCT Application GB No. 82/00179.

Two entirely different optical data storage systems have found commercial acceptance, one employing microfilm and the other employing optical laser storage methods.

In microfilm systems, high capacity optical data storage is effected photographically on light-sensitive microfilms, such as microfiche. Capacities of up to 10 million bits/mm$^2$ have been achieved, the maximum being limited by the quality of the photographic emulsions available. The production of microfilms for a very high capacity system is therefore very expensive. Moreover, some data bases (e.g. automobile part catalogues) require large numbers of identical copies, so that the expense of reproducing such microfilms has to be taken into account. On the other hand, a microfilm reader is relatively inexpensive as it does not rely on laser illumincation and can employ a relatively cheap optical imaging system. Nevertheless, it can be a time consuming operation to located desired information on microfilm, although this problem has been alleviated to some extent by the use of microfiche, which involves reproducing a large number of pages of data on a single sheet which can be searched manually in two dimensions.

U.S. Pat. No. 4,179,743 discloses a microfiche system having a two-dimensional array of 'pages' arranged in a rectangular storage zone, the pages having distributed amongst them control data for page location. The controdata is an intrinsically ordered set of alphanumeric data containing classifying data pertaining to associated pages. Such a system can only be used with pre-ordered data, such as a dictionary in alphabetic order. Storage space is reduced by distributing the control data through the storage zone.

Optical laser storage systems using discs have been made wherein data is stored in the form of a coded series of pits in concentric rings, or spirals, on the surface of a transparent disc. The data is read using a source of coherent laser illumination focused on each of the pits in turn as the disc is rotated. The spot size of the illumination must be less than or comparable to the area of a single pit.

The light defracted by the pits, either on reflection or in transmission, is monitored to reconstruct electronically an image of the storage data. The data in this case is necessarily encoded and so is not directly readable, requiring the use of electronic decoders to convert the stored data into signals suitable for a video display unit. Such a system makes it possible to produce very good random-access times. One such system is described on pages 26 to 33 of the IEEE Spectrum of August 1979. In that system each set of information is accompanied by an address heading to locate information on the disc. This system for location is efficient in that context, where the data is digitally encoded and is read serially whilst the disc is spinning at high speed. Such a system, attaching a heading to each item of data, takes up space on the disc and would not clearly be efficient in microfilm-type applications.

A disc has been proposed with which it is possible to image optical data without the use of laser light, somewhat in the manner of microfilm or microfiche. Such a system is disclosed in British Patent Specification No. 1,091,981 and comprises the use of a disc having a spiral groove and between the turns of the groove a flat spiral land having a coating of photographic emulsion constituting a video track. A reading head is employed which has a pick-up which physically engages the groove for the purpose of accurately locating the reading head relative to the video track. Video data is recorded on the track so that a flying spot scanner can scan picture elements in a linear fashion.

For this purpose the reading head incorporates a light source and lens enabling an image of the video track to be passed along the recording head to a flying spot type pick-up tube. No method is provided for random-access as it is believed that the system of that specification is intended for sequential reproduction of images as in a video player.

An object of the present invention is to provide an optical data storage system which does not rely on laser light, but which is capable of efficient random access.

SUMMARY OF THE INVENTION

According to one aspect of the present invention there is provided an optical data storage system comprising a substantially planar data storage member and a processing apparatus for processing areas of said member, the storage member comprising:
  an information storage zone for storing images which can be read optically by use of non-coherent light; and at least one control data zone defining a datum for a first and for a second co-ordinate for the storage member, the control data zone being distinct from said information storage zone; and the processing apparatus comprising:
  processing means for processing areas in said information storage zones;
  drive means for producing relative motion between the storage member and processing means so that the processing means can be positioned to process different areas of said storage member;
  input means for defining desired values for the first and second co-ordinates of an area of the information storage zone to be processed;

and
  a servo system for reading said control data zone, without contact with the storage member, and for operating the drive means in dependence upon said desired values for causing said processing means to be positioned to process the information storage area defined by the desired values.

The preferred system is based on a disc-shaped storage member having angular co-ordinate control data. A rectangular system is also possible and references to angular and radial co-ordinates in the following discussion can also be applied to the x- and y- co-ordinates of a Cartesian system. In a polar system, the control data zones preferably comprise a first annular track containing absolute angular position data and a second annular track providing incremental angular data and which may be used to determine angular motion of the storage member relative to the processing means from an angular position previously read from the first annular track. The first annular track is preferably arranged to be read via the processing means, utilising an optical system carried by the processing means. Thus, this track may be the innermost control data zone or at or near the periphery of the storage member so as to be substantially in a given innermost or outer radial position. The second track is preferably arranged to be read by a fixed transducer, e.g. a moiré fringe transducer, this second track therefore preferably being at or near the periphery of the storage member. Utilising these two tracks, it is possible to position the processing means very accurately relative to the storage member on a given angular co-ordinate thereof. As an initial step, the servo system would cause the optical system to be driven to the first track whilst the disc is rotating so that the optical system can then scan successive absolute angular position indicators, halting the disc when a desired indicator has been reached. Any further relative rotation of the disc relative to the processing means can then be accomplished by subsequent use of the fixed transducer reading the incremental second track.

For radial servo-control, means providing radial position data preferably comprises the aforementioned tracks which provide a datum or 'zero' for the radial co-ordinate. Measuring means of the apparatus can then provide incremental radial data. Those measuring means can be calibrated by reading a set radial distance on the disc, e.g. between one of the annular tracks and a further annular track. Alternatively, there may be at least one radially extending track conveying radial incremental data, whereby radial position can be measured and controlled relative to a fixed radial position, e.g. the fixed, known, radial position of the absolute angular position data track. Such radial tracks are preferably also read by means of the processing means, utilising, for example, a further moiré fringe transducer.

According to a second aspect of the invention there is provided an optical data storage member which is a substantially planar member comprising:
a first, information storage, zone for the storage of information which can be read optically; and
at least one second zone distinct from the first zone and which stores machine readable control data defining a datum for a first and for a second coordinate of a two-dimensional co-ordinate system for the first zone.

According to the third aspect of the invention there is provided an optical data processing apparatus for processing information conveyed by a planar data storage member having first, information storage, zones for storing optically readable data, and second, control data, zones distinct from the first zones and which store positional data for a two-dimensional co-ordinate system for the member, the apparatus comprising:
means for supporting said storage member in a position for reading;
processing means for processing individual areas in the first, information storage, zones of said member;
drive means for producing relative motion between the storage member and said processing means so that the processing means can process individual different areas of said storage member;
input means, for defining desired values for co-ordinates of an area of the information storage zones to be processed; and
a servo system for reading said second, control data, zones of said member, and for operating said drive means in dependence upon positional data obtained from said second, control area, zones and upon the desired values to cause said processing means to be positioned to process the information storage area defined by the desired value coordinates.

All the data in the control data zones may be stored in the form of the amplitude-modulation of the relief height of a pattern of surface relief variations, the data being readable in at least one diffraction order by illuminating the control data zones with non-coherent light. The pattern of surface relief variations is designed so that, without modulation, its image is substantially "black" in one diffraction order, amplitude-modulation of that pattern causing the image in corresponding areas to lighten in that same diffraction order, preferably the zero order. Such a method of storing data has been disclosed, for example, in U.S. Pat. No. 3,732,363 which describes the application of relief patterns to the production of images in a microfilm-type system. British specification No. 902397 also discloses such a method of recording as applicable to a disc, but in all cases the information recorded is fundamentally analog data to be displayed to the user rather than control data for use in random access to the analog data.

It will be apparent that storing data by means of modulation of a relief pattern is advantageous compared to photographic emulsion storage as it does not absorb light and therefore no potentially damaging heat is generated during reading. Data stored on the member in this way does not fade with age, nor need it wear away with use as no contact is made with the surface during reading and a protective cover may be provided permanently or for storage purposes. Another major advantage with this method of storing control data is its ease of reproduction. Once a corresponding metal master disc has been produced multiple copies can be produced very cheaply on thermoplastic sheets or discs by an embossing process.

It will also be apparent that the information storage zones of the storage member can also have data stored on them by the same technique, this data also being incorporated in the metal masters for embossing with the control data. In this way an analog data base can be reproduced a large number of times very cheaply, and at the same time it will be appreciated that the reading apparatus required can be relatively inexpensive firstly because laser illumination is not required and secondly because positional control is simplified by the use of the control data zones conveying positional information. In particular, positional tolerances are by no means as severe as with known optical laser storage systems. Not only can laser illumination be avoided but the source luminance required is very low compared to known laser storage systems.

A further advantage over optical laser storage systems is that the information can be stored in the information zones in a manner analogous to microfilm technology, i.e. as a plurality of individual pages of analog images each of which can be viewed in its entirety at any one moment by the optical system of the reading head and whilst the disc and reading head are stationary with respect to one another. In view of the fact that the images can be read whilst the storage member and reading head are stationary, one obviates the need for fast motors and for complex and expensive tracking error correction equipment which is needed for optical laser storage systems.

It will also be apparent that because pages of data can be recorded on the storage member so as to be directly readable and optically projected onto, say, a screen, one also obviates the need for expensive electronic decoders. Not only can one store alphanumeric information in this way but graphical information may also be recorded, graphics being difficult to record and reproduce accurately with known digital techniques.

Nevertheless, data may be encoded and stored digitally on the information storage zones of the storage member if a user requires it, the storage member then acting as a digital read-only-memory.

As indicated above a disc storage member can be provided as an embossed thermoplastics disc bearing as a modulated relief pattern not only control data but simultaneously a large number of pages of analog data.

Another interesting possibility is to supply storage members to users with the embossed control data zones, but leaving the information data zones free for the user to record his own data on the storage member in any way he requires, even photographically.

In one embodiment the disc storage members also have stored on them one or more further circumferential tracks, these containing digital data, which may be recorded by a modulated relief pattern as described above. The digital information in such a track or tracks may take a variety of forms, in particular may define an index to the "pages" of data recorded in the information zones. The digital data may furthermore include control data defining the type of storage member, e.g. defining to the reading apparatus whether such indexing data is present, with address of a menu page or 'first' page and so forth. Such data may automatically control the apparatus, e.g. to display the menu or 'first' page immediately on loading the disc. A track or tracks may also contain programming information instructing the apparatus in other ways as to its mode of operation.

Digital data stored in a track or tracks of the storage member is preferably in the form of a series of digital characters or words succeeding one another circumferentially along the track, each such character or word comprising a set of bits which succeed one another in the radial direction. The optical system of the reading head can thus project at least one character or word onto, for example, an array of photo-sensitive elements which can effect a parallel read-out of that character or word. Thus, whilst such data is in one sense read serially as in known laser storage systems, the present apparatus in fact reads a series of multi-bit characters, which are individually read in parallel rather than as individual bits of data.

A further feature of such a digital track or tracks in a preferred embodiment is the provision of a guard band on one or both sides of the track, the band again preferably being an embossed relief pattern and itself providing radial positional information for aligning the reading head with the digital track concerned. A plurality of such bands could also be provided to constitute the means providing radial position data referred to above, e.g. instead of radial tracks.

A guard band may also be read for one complete revolution to provide a measure of eccentricity which can be used as a compensation during servo-control of the reading head and storage member.

With regard to the servo system, this preferably comprises two motors, one for radial positioning and the other for rotational positioning. Each has a servo system operable as follows.

Firstly the input data defining a required position is analysed to calculate the desired angular and radial coordinates. These values are desired value inputs to the two servo systems. From the control data on the storage member, the actual coordinates are known of the reading head position relative to the storage member, and from these the 'error' or desired travel is calculated. A two stage process is then effected in each coordinate direction.

Firstly a coarse drive is applied to tend to reduce the 'error' to zero until a 'window' around the final target is found. Then a fine control is effected, using incremental radial or angular control data to drive the corresponding motor in a stepping mode to the final position. Knowing the desired travel, a predetermined acceleration-deceleration pattern can be precalculated in dependence upon the 'error' for the coarse control.

Thus, preferably the servo means comprises calculating means arranged to provide an acceleration phase in which the motor is driven by a substantially constant voltage until it is detected that a calculated position, depending upon said difference, has been reached, followed by a deceleration phase in which the motor is driven by a deceleration voltage which is recalculated at the beginning of each of a plurality of sampling periods by the calculating means in dependence upon the instantaneous value of said difference and its rate of change.

Microprocessor technology is preferably employed to effect this servocontrol.

A further aspect of a preferred embodiment concerns optical focussing and storage member support. As proposed above, the storage members may be cheaply reproduced thermoplastics discs. As these are effectively floppy discs, support and focussing of the imaged data is a problem. The above-mentioned IEEE Spectrum article discloses an expensive optical system using a polarizing beam splitter and semitransparent mirror for obtaining illumination, tracking error data, the data signal and a focussing error signal. The latter signal is employed for focussing control.

In the preferred embodiment of the present invention, an air bearing is used for support and for focussing control.

Preferably the air bearing has means for creating air pressure on both sides of the member, to support the member between two thrust pads.

BRIEF DESCRIPTION OF THE DRAWINGS

For a better understanding of the invention and to show how the same may be carried into effect, reference will now be made, by way of example, to the accompanying drawings, in which:

FIG. 18 is a view of coded data on the member of FIG. 17; and

DETAILED DESCRIPTION OF PREFERRED EMBODIMENTS

FIGS. 1 to 14 show an embodiment of an optical data storage system comprising optical data storage members in disc-form and an optical data reader.

Figure 1:
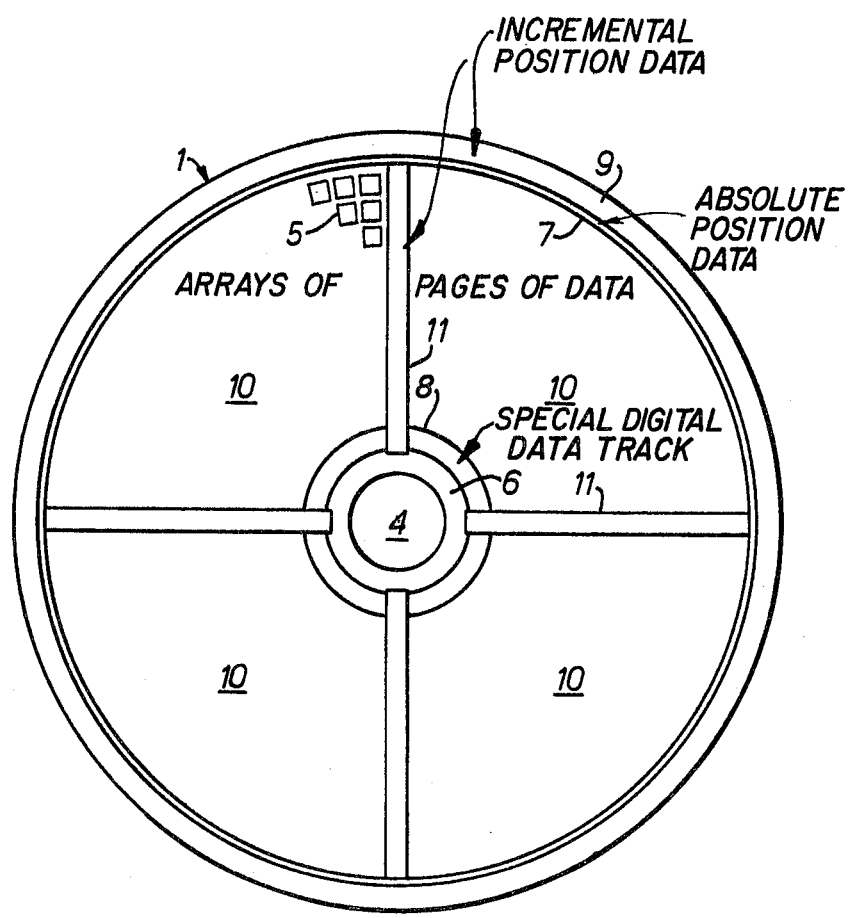
FIG. 1 shows a schematic view in plan of a data storage member.
Figure 2:
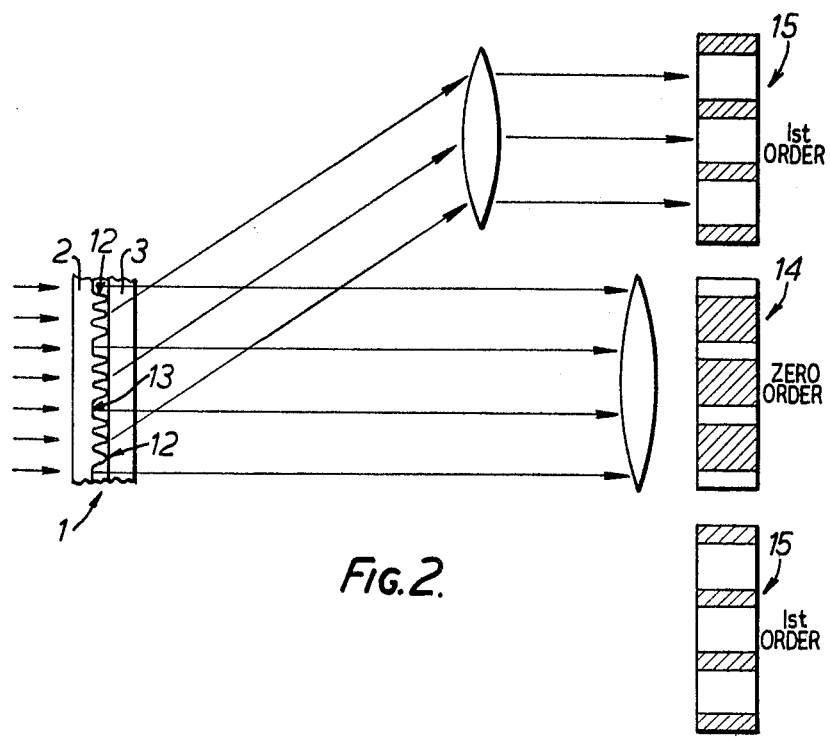
FIG. 2 is a schematic view in section of the member of FIG. 1.

FIGS. 1 and 2 illustrate an example of an optical data storage member 1 in schematic plan and section.

The member 1 is a transparent laminated thermoplastics (PVC) disc of about 30 cm diameter consisting of two discs 2 and 3 (FIG. 2) of 50 to 100 microns thickness and which are sealed together, e.g. statically- or heat-sealed at their periphery and centre. Disc 2 is embossed on one surface with data as a surface relief pattern, preferably of regular form (e.g. as parallel sets of ridges or as a regular grid or grids of projections) with the ridges or projections amplitude modulated in height. This pattern is protected by the second, transparent, disc 3.

A hole 4 is provided in the central area of the disc for locating the disc 1 in the data reader. The illustrated disc 1 carries optically displayed information data and also control data. The information data is arranged on the disc 1 in zones 10 in substantially rectangular areas 5, each such area being referred to herein as a 'page' of data. These pages 5 are arranged in concentric circles. In principle, any arrangement of the pages is possible such as spiral, square grid or even random, but an arrangement with concentric circles enables a simpler control system to be provided to locate individual pages. The pages 5 may be of any variety of sizes depending on the resolution and reproduction size requirements and the pages on a single disc need not all be of identical sizes. A typical page size may be between 3.4 mm×2.4 mm and 2.8 mm×2.2 mm for A4 optical projection read-out. This gives a capacity of between 7,000 and 12,000 pages in zones 10. It will be noted that the page size indicated in FIG. 1 is greatly exaggerated. Typically 0.9 mm² could be a minimum bearing in mind the illumination intensity and optical system required.

For video reproduction on a conventional video display unit, the page size might be a minimum of 0.8 mm×1.14 mm typically 1.6 mm×2.2 mm, giving a much greater capacity of pages.

A central annulus 6 of about 5 cm radius is left substantially free of data and radial and circumferential tracks 7, 9 and 11 are also provided, these carrying analog and/or digital coded page locating and control data. The control data is intended to be used by positional servos to provide page access. The form of this control data will be describe later with reference to FIG. 3. A track or tracks 8 of digital data is also shown and will be described later.

The surface relief pattern on the disc is, in this example, in the form of a diffraction grating, also called a carrier frequency grating, modulated by the data to be stored. This is diagrammatically shown in FIG. 2, which illustrates the simplest form of this modulation, wherein the modulation is either present, as at 12, or not, as at 13. To reconstruct an image of data stored on the disc in this way, a light is shone through the modulated grating over one complete page and simple optics are used to view one of the diffraction orders, preferably the zero order, from that page. As illustrated in FIG. 2, light passing through the areas 12 where grating is present is diffracted out of the zero diffraction order 14 to the first order 15 and therefore reconstructs as black in the zero diffraction order 14, whereas those areas 13, where the grating is absent, let light through into the zero order and there reconstruct as white. In the first diffraction orders 15 the areas 12 reconstruct as white and the areas 13 as black. Hence a black and white image of the data stored in one page of the disc is reconstructed in both orders. Either image can be directly viewed by the user through optics, or by amplification by a photoelectric amplifier before display, or by the use of electronic means converting the analog page into corresponding video signals for a video display unit. The height of the variations in the surface relief are chosen to give the best black to white intensity ratio, i.e. to give the least light in the zero order, and may typically be about 0.85 μm in height.

It should be noted that many forms of carrier grating or other pattern are possible. For example, a superposition of a number of gratings may be used to increase the black density. Two crossed sine gratings can give black optical densities of up to 1.8. Of course the reconstructed image contrast can be enhanced electronically.

The capacity of the disc depends on the maximum spatial frequency that can be embossed on the disc. For a thermoplastic disc, this maximum is around 2,000 cycles/mm. The highest information spatial frequency using this method of recording information is about half the spatial frequency of the carrier grating, i.e. about 1,000 line pairs/mm. The dimension of the smallest resolvable picture point in the zero order is equal to the pitch of the carrier grating.

Although a very fine grating gives a high information storage capacity and good resolution, it also requires stricter tolerances. The optimum spatial frequency of the carrier grating is probably around 400 to 700 line pairs/mm giving a pitch of 1.4 μm. A density as low as 125 lines/mm can give acceptable results in some circumstances, but a density at least as high as 250 lines/mm is preferable and above 350 lines/mm is most preferable. The upper limit depends on the wavelength used and technological limits but 2000 lines/mm seems feasible.

The optimum profile and amplitude of the carrier grating is that which produces no light in the zero diffraction order over the largest part of the visible spectrum. This optimum will now be described.

A blazed grating profile and a sinusoidal profile achieve satisfactory results in this respect. A sinusoidal profile is used in the described embodiment as it is relatively easy to produce, e.g. by recording two beam interference fringes in photoresist, or by electron beam profiling of thermoplastic, as will be described later. A grating having an optical amplitude A of 425 nm is preferred and results in the highest black density in the zero order; the physical peak-to-peak amplitude = $A/_{n-1}$ (n is the refractive index of the disc material), and for thermoplastic with n=1.5, the preferred physical amplitude is 425 nm/(1.5−1)=0.85 μm, as mentioned above.

A square grating with a mark to space ratio of 1:1 gives a good zero order attenuation over a small range of colours and hence a colour filter may be used to reduce zero order transmission.

The described disc storage member can also be used to store grey scale or colour images. A grey scale can be recorded by variation in the mark to space ratio of the relief pattern. Areas of the pattern having unity mark to space ratio reconstruct as black in a projected image; as the mark to space ratio decreases, the whiteness increases. Areas having no pattern reconstruct as white.

A more straightforward alternative way of producing grey scale images is to use a standard printing industry half-tone raster technique. The image then consists of a pattern of dots in 'black' or dots in 'white'. The grey level in a reonstructed image is determined by the local concentration of these dots.

Colour images can be recorded using two pages of information, preferably side by side, on the disc. One page records the luminance signal in black and white, the other records colour information. Such a disc can only be read in colour using two detectors, one for each of the two side-by-side pages, and electronic processing to combine the information in the two pages to form a single colour page.

Alternatively, colour information can be recorded using a height encoded pattern. A square wave pattern profile is particularly good for this application, as the zero order light from a square wave grating is colour sensitive. Carrier patterns of three different amplitudes are used, one corresponding to each of the primary colours. Regions of a page which comprise relief pattern having a high diffraction efficiency for a particular colour will produce a region in the image of that page of the complementary colour, e.g. a grating having a higher efficiency for green light appears magenta.

Frequency, or angle, encoding colour information is also possible. In this case the frequency, or angle, of the carrier pattern, is chosen so as to reconstruct a particular colour in the zero diffraction order (or in whichever order the data is being read).

Figure 3:
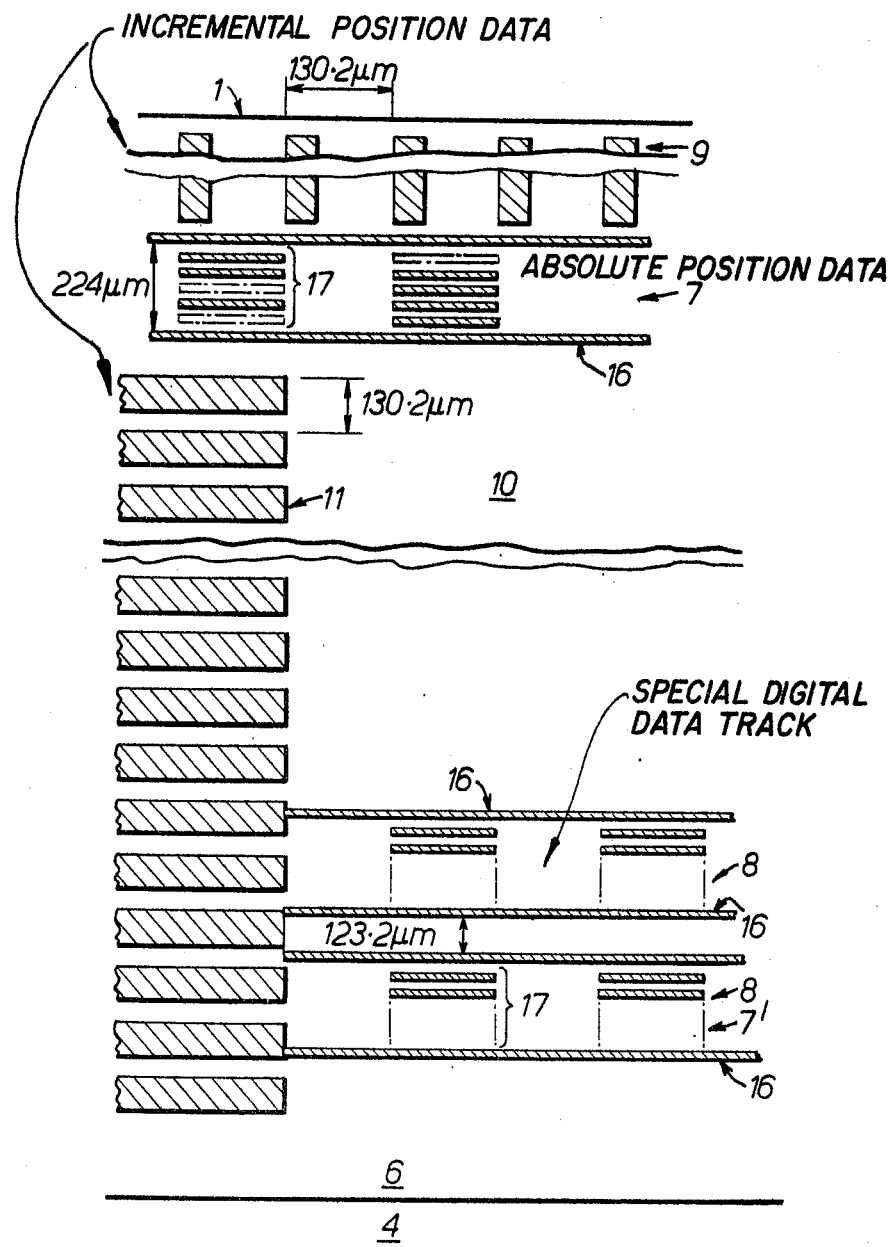
FIG. 3 is a view of coded data on the member of FIG. 1.

FIG. 3 is a diagram of the control data tracks in developed form. Each bit of data is hatched in this figure and corresponds to unmodulated grating, the plain areas which are adjacent being 100% modulated, i.e. 'white'. The reverse is also possible when the hatched areas are 'white'.

At the periphery is the incremental, angular position, track 9 consisting of a regular series of bits at a spacing of 130.2 μm and with a width of 2 to 3 mm. A fixed moiré fringe transducer will continually monitor this track to provide an angular measure of the travel of disc 1.

Below track 9 in the figure is the absolute angular position track 7 (an alternative position 7' is shown just above area 6). This track comprises a pair of guard rails 16 of 5.6 μm width between which are sets 17 of bits, each set being a radially extending 20 bit character comprising 16 data bits and 4 control bits, e.g. providing a check digit. Each set comprises hatched areas representing digital '1' and unhatched areas (shown dotted) representing digital '0'. There is one set aligned with each successive pair of bits in track 9. This track therefore defines the absolute angular disc position every 130.2 μm. Circular rails or tracks 16 serve the purpose of defining the limits of the data and also enable disc eccentricity to be measured. During one complete revolution of the disc the rails can be scanned and at each set of bits 17 an eccentricity value can be measured and stored to provide eccentricity compensation during servo position control.

One or more data tracks 8 are also provided and have the same structure as track 7.

One of four radial tracks 11 is also shown in FIG. 3, consisting of a series of bits, as does track 9, with a spacing of 130.2 μm and a width of 2 to 3 mm.

Each radial track corresponds in extent to a radial series of pages and divides the information carrying area into four zones 10.

Figure 4:
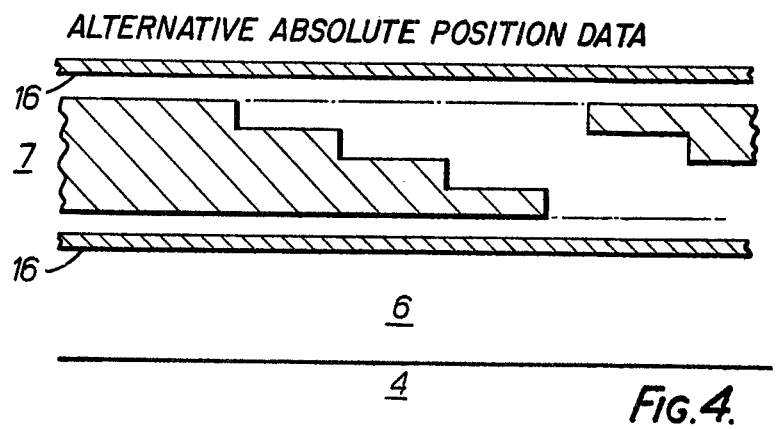
FIG. 4 shows a modification of FIG. 3.

FIG. 4 shows an alternative form of track 7 using a form of Gray code. As an example, this track is shown adjacent area 6.

It will be apparent that all these bits of FIGS. 3 and 4 could be provided as magnetic or photographically produced markers, but preferably are optically readable gratings as already described to unify the technology employed and to enable disc reproduction to be carried out by a cheap thermoplastics embossing process.

The plastics discs may be produced by known replication techniques similar to those used in the gramophone industry, from metal master discs.

The metal master discs may be made in any of the following manners:
1. Photomechanically.
2. Using a laser beam.
3. Using an electron beam.

The photomechanical method comprises first producing a diffraction grating on a metal disc, then covering it with photoresist and exposing the photoresist to micro images of the pages and control data to be recorded. After development, the resultant surface relief pattern is electroplated and then used as a stamping master.

The diffraction grating may be arranged on the disc in a variety of manners. It may be as a series of parallel straight lines running across the disc, or as a series of concentric circles, or as a spiral centred at the centre of the disc.

Preferably a single grating covers the whole disc, but a patchwork of gratings, even of different orientations, may be used. In this latter case, care must be taken to ensure that no page of data is embossed on a grating join. It will be appreciated that a disc having a patchwork of gratings can only be easily read using the zero diffraction order.

The grating may be produced by any known techniques: by ruling, e.g. using laser or electron beam scanning, or by recording two beam interference patterns in photoresist.

A metal master disc covered with a diffraction grating can be used to generate a large number of copies, each of which can then be coated with resist and exposed to micro images. A precision computer controller can then automate and synchronise the indexing of all the copies.

A laser beam can be used directly to write a high resolution modulated diffraction grating and can produce a 30 cm diameter master disc in less than 30 minutes. In this process, a master disc, coated with photoresist, is rotated continuously while a modulated laser beam, focused to a spot on the disc, tracks radially. This process results in a modulated diffraction grating drawn on a spiral.

Of course the data to be recorded in this manner is buffered and multiplexed into a complex format to supply the data in a suitable order for recording i.e. recording cannot be effected in real time.

Alternatively, this method could be used simply to record a spiral diffraction pattern on the disc whilst other methods are used subsequently to provide the data as modulations of the grating.

Another method avoiding buffering is to generate a laser raster pattern with a spot diameter of approximately half the carrier grating pitch to compose each page individually on the disc. This would enable easy updating of disc masters with new pages. However, the laser beam deflector needed for this method needs very high performance characteristics, for example, for a 700 lines/mm carrier grating a resolution of 1400 spots/mm is needed in conjunction with an access time of 30 μsecs for a standard video scan rate. Polygonal, multi-faceted continuously rotating mirrors and holographic grating scanners have been found to give the best performances.

An electron beam can also be used to write master discs either by writing a modulated grating directly onto electron beam resist, or by the technique known as thermoplastic recording. Thermoplastic recording comprises depositing charge from an electron beam onto the surface of a thermoplastics film spun onto a flat substrate. The thermoplastics film is separated from the substrate by a metal film and is heated above its plastics flow temperature, causing the surface to deform under the action of electrostatic forces. The metal film preferably has graded resistance to provide a uniform heating pulse. Smooth curves always result from this method. It is possible to tailor the spot size, and hence the charge distribution, the mean beam current, the amplitude of modulation and the heating pulse in order to produce reasonable groove profiles and particularly sinusoidal grooves.

Square wave groove profiles can be produced by electron beam recording in electron resist, with a typical groove depth of 0.9 μm in a polymer for an electron energy of 8 kV. The width of the groove can be adjusted by adjusting the current and spot size of the beam, and consistent shapes are obtainable.

Preferably, writing is accomplished by rotating the disc slowly on a precision rotary table, whilst an electron beam writes radially in circumferential tracks. This method allows sequential writing of complete pages allowing signals in normal video format to be used without complex buffering and multiplexing.

Alternatively, the disc can be rotated continuously and translated radially, using a fixed electron beam to generate a spiral grating.

Electron beam master recordings tend to have higher resolution than those made photomechanically or with lasers.

Once a thermoplastic or resist master disc has been prepared and developed, a metal stamping master is formed and then replicated. A metal stamping master can be formed from a thermoplastic master disc by deposition of a metal (either in vacuum or by chemical reduction). The thickness of the deposit can be increased by electroplating.

Replication is carried out on thermoplastics discs using a hot stamping press. The temperature of the master is held above the glass flow temperature of the thermoplastics disc and pressure is applied to transfer the master pattern to the thermoplastics disc. The master and thermoplastics disc are then separated and the disc is allowed to cool.

Reproduction of a disc by this method takes approximately 10 seconds. The speed can be increased by a thermal pulse derived from a large current pulse applied to the metal master; alternatively Radio Frequency heating may be used to increase the production rate to approximately 10 per second. Up to 10,000 embossings from a single master is possible under optimum conditions.

Figure 5:
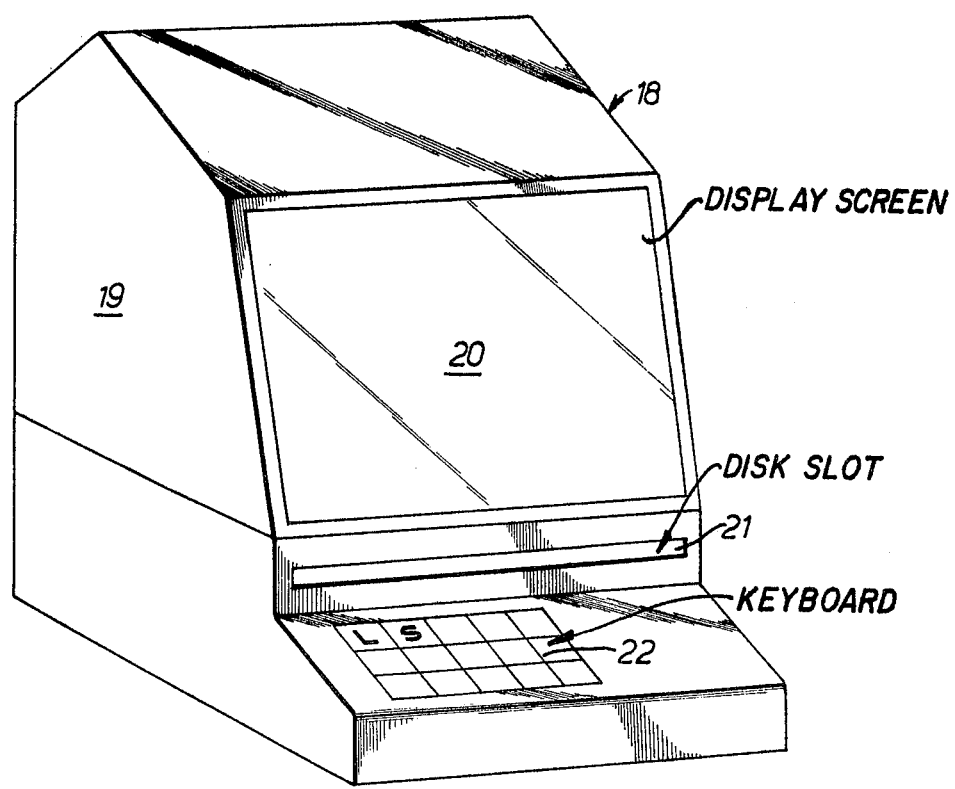
FIG. 5 is a perspective view of a reader for the member of FIG. 1.

FIG. 5 is a perspective view of a reader 18 for the described discs. An upper housing 19 supports a translucent screen 20 and contains mirrors (not shown) to project an image onto the screen. The lower part of the reader has an aperture 21 for the insertion of discs and an input means 22 in the form of a keyboard. On operating the keyboard, a drawer will project from aperture 21 and a disc will be inserted in the drawer. Further operation of the keyboard causes the drawer to be pulled back into the reader.

Within the reader is a chassis 23 which will now be described with reference to the partially cutaway view in FIG. 6.

Mounted on this chassis 23 is a vertically extending bearing tube 24 containing bearings 25 rotatably supporting a disc drive shaft 26 carrying at its upper end a cup-shaped member 27 which will engage the underside of a disc. The lower end of shaft 26 carries, below the floor of the chassis 23, a drive wheel 28 comprising a rubber-covered rim 29 supported by a plurality of spokes, one of which is shown at 30. The rim 29 engages the shaft 31 of a DC analog motor 32 having a flywheel 33. This provides a 1:40 coupling between the motor 32 and the drive shaft 26. The motor 32 is pivotally supported about an axis 34 and is biased by a spring 35 to urge the shaft 31 against the rim 29. The flywheel is mounted with clearance in an aperture 36 in the floor of the chassis.

A transverse wall 37 and two upstanding posts 38 provide four attachment points for various elements now to be described.

Firstly, the four attachment points support two rails, one of which is shown at 39, these rails providing a guide for the drawer mentioned above. The attachment points also support two guide rods, one of which is shown at 40 and which provide guides for a reading head, to be described later. Below the illustrated rod 40 is a lead screw 41 which is rotatably supported by one of the posts 38 and by the wall 37. This lead screw 41 will engage a threaded member attached to the reading head as will be described hereinafter. The lead screw 41 is driven by a DC analog motor 42 having a flywheel 43.

Figure 6:
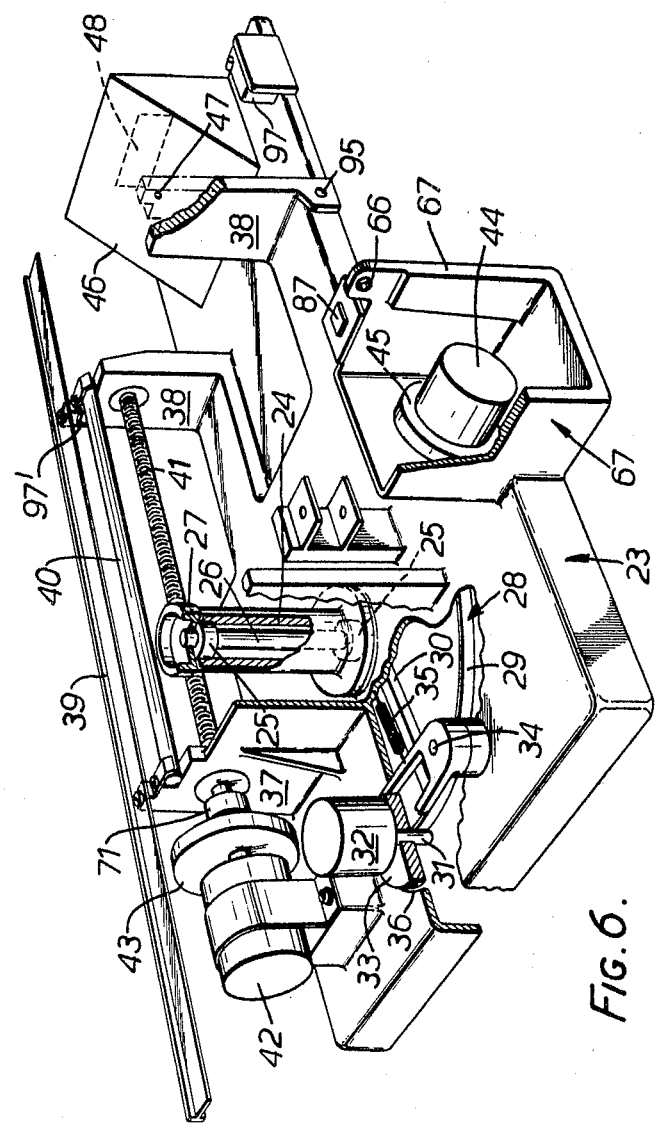
FIG. 6 is a perspective view, partially cut-away, of the reader of FIG. 5.

FIG. 6 also illustrates a further DC analog motor 44 with flywheel 45 the purpose of which is to act via a cam mechanism to be described to actuate the drawer and a disc clamping mechanism.

The chassis also supports a mirror 46 which will reflect images towards the screen 20 shown in FIG. 5. An aperture 47 is provided in the centre of mirror 46 to enable a portion of the light impinging on this mirror to pass through it to a photocell array 48, the purpose of which is to read the digital data in the tracks described above. The array 48 contains 256 individual photocells.

Details of the reader will now be further described with reference to FIGS. 7 and 8, FIG. 7 being a partially cut-away plan view of the chassis shown in FIG. 6 and with certain parts removed, and FIG. 8 being a cross-sectional view of the reading head.

Figure 7:
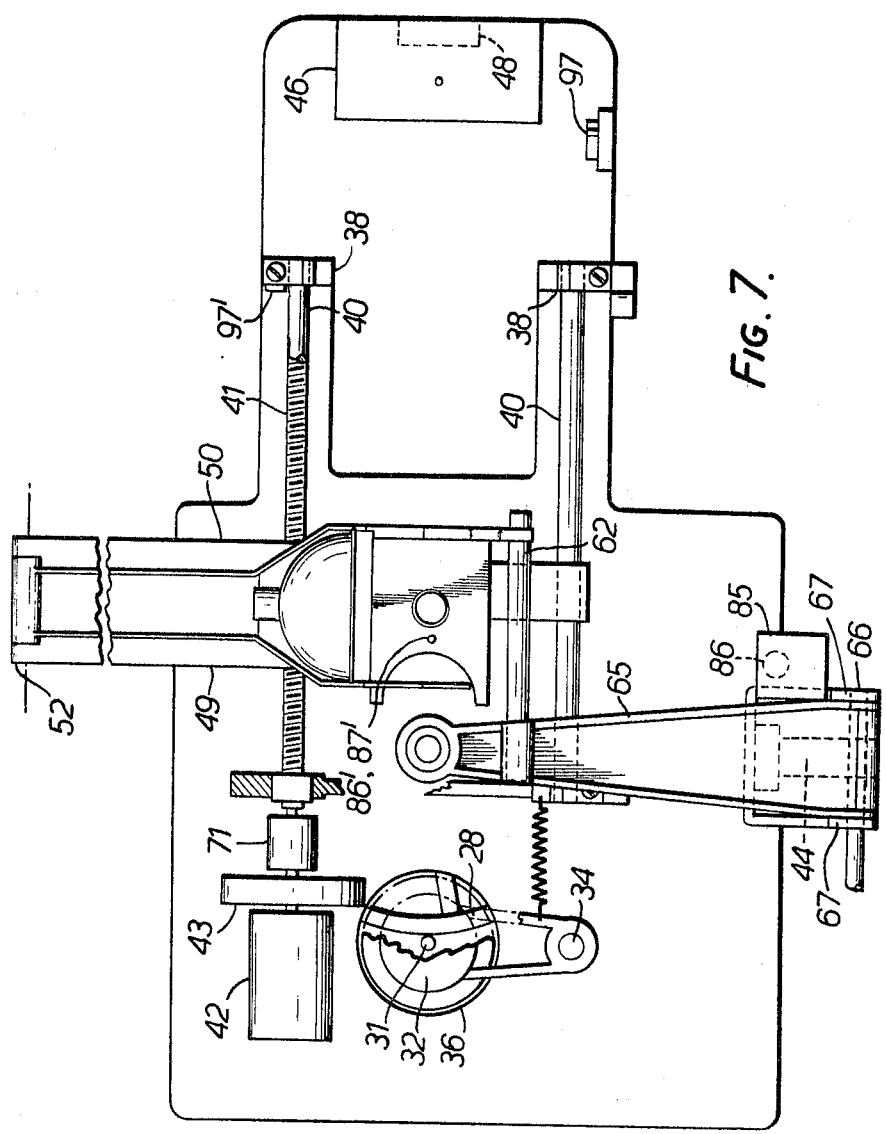
FIG. 7 is a plan view partially cut-away of the reader.

FIG. 7 shows the guide rods 40 and the lead screw 41, all engaging the reading head generally designated 49.

Figure 8:
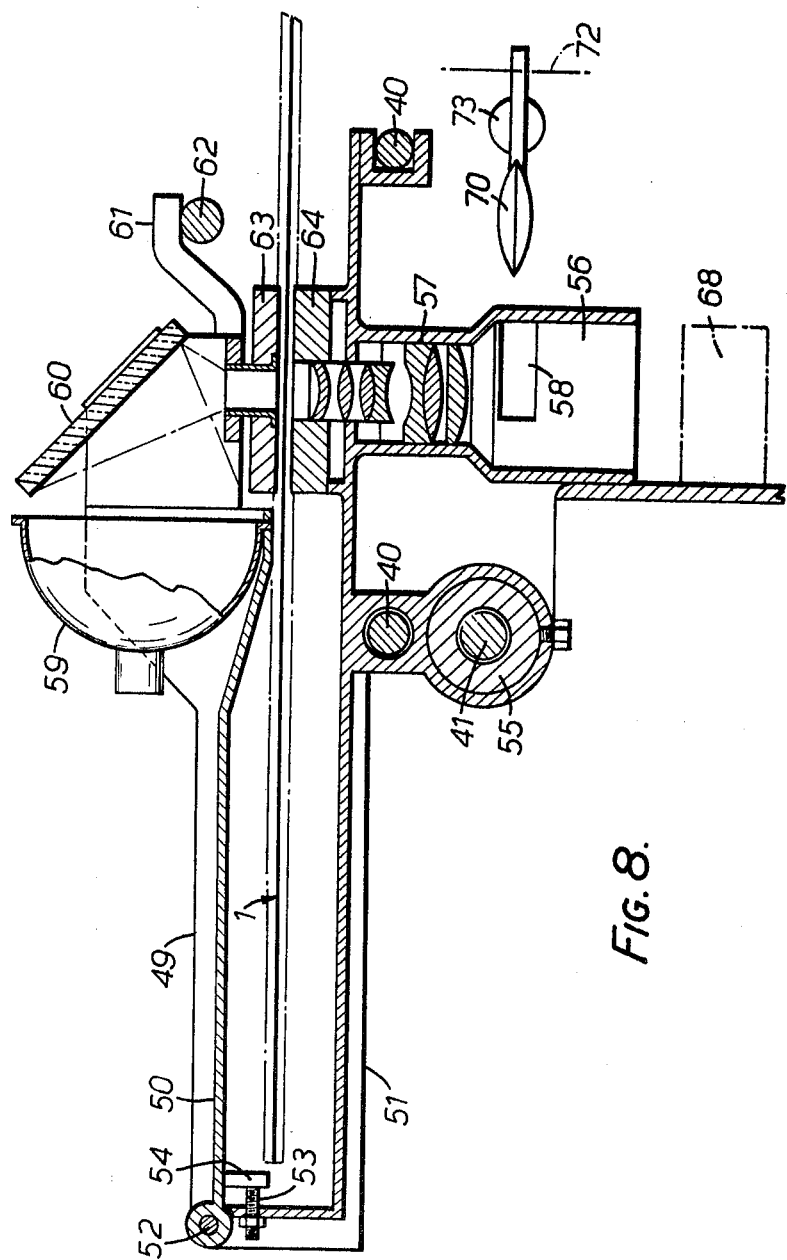
FIG. 8 is a cross-sectional view of a reading head of the reader of FIG. 5.

The reading head 49 as shown in FIGS. 7 and 8 comprises two major parts, an upper arm 50 and a lower arm 51. Arm 50 is pivotally supported at 52 to the lower arm 51 and its horizontal orientation can be adjusted by way of a screw 53 which engages a stop 54 projecting from arm 50. The lower arm 51 is engaged by the lead screw 41 in screwthreaded engagement with a back-lash free nut arrangement 55. The rods 40 are also shown, in FIG. 8, to be in sliding engagement with the lower arm. The lower arm 51 also carries a tube 56 which contains a set of projection lenses 57 and which also incorporates a slot 58 into which a further lens may be inserted to alter the optical characteristics of the path, in particular to adapt the magnification of the optical path for scanning the digital data by means of the photocell array 48.

The upper arm 50 supports a light source 59 comprising an ellipsoidal reflector. Illumination from the light source 59 is reflected downwardly by means of a mirror 60, carried by arm 50, through disc 1 to the lenses 57.

The arm 50 also has a projection 61 which engages a rod 62 which is part of the disc drawer mechanism to be described hereinafter. The rod 62 is actuated to lift the arm 50 away from arm 51 to enable insertion and removal of the disc 1, with its drawer, to be effected.

An air bearing arrangement comprising air bearing members 63 and 64 is also provided to enable the relatively flexible disc 1 to be stabilised in the area being imaged in order correctly to focus the image relative to the optical system.

FIG. 7 also shows a pivoted arm 65, which carries the rod 62 and which forms part of the disc clamping mechanism. This arm 65 is pivotally supported at 66 to uprights 67 of the chassis, these uprights 67 being illustrated in FIG. 6.

Figure 9:
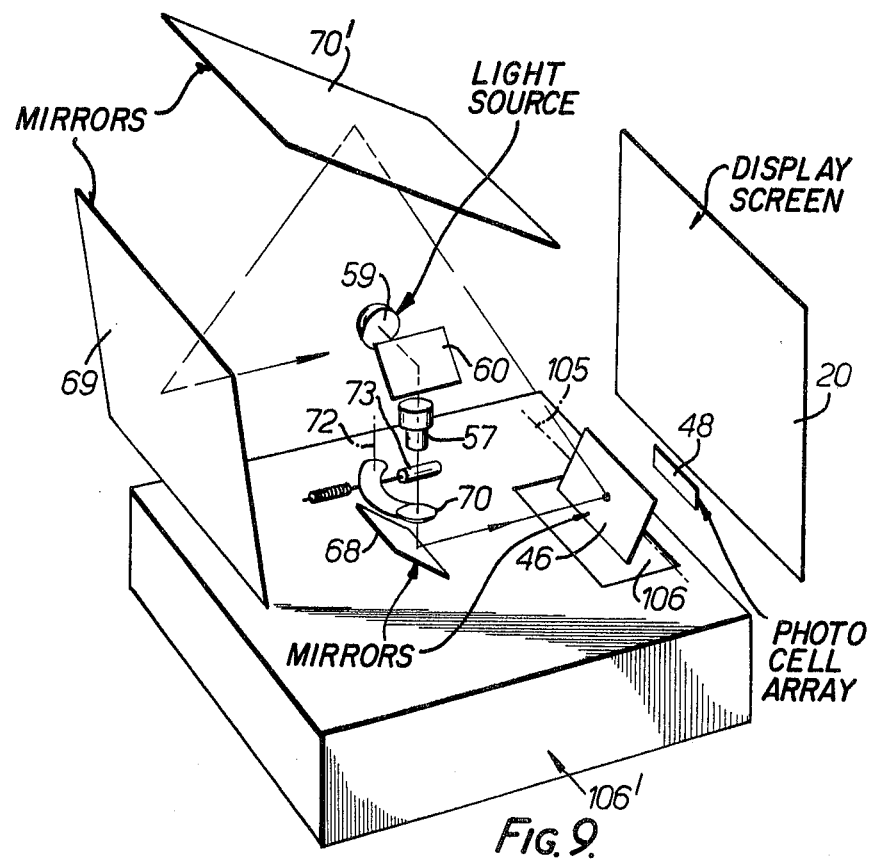
FIG. 9 is a schematic diagram of the optical path of the reader.

FIG. 9 is a diagram of the optical path in the reader. Light from source 59 is reflected downwardly by mirror 60 through the disc and lenses 57 to a mirror 68 (FIG. 8). Mirror 68 reflects the light horizontally to mirror 46, thence to screen 20 via mirrors 69 and 70 in housing 19. Some light impinging on mirror 46 will pass through to the photocell array 48. The further lens mentioned above is shown at 71, is pivotally mounted at 72 and is actuated by a solenoid 73.

FIG. 9 also illustrates diagrammatically an alternative embodiment in which mirror 46 is pivotally mounted about axis 105 to direct light downwardly through aperture 106 to a hard copy printer 106'. This may be based upon a known principle, such as a plain paper copier, or a dry-toned zinc oxide paper copier or a dry silver photographic paper copier.

Figure 10:
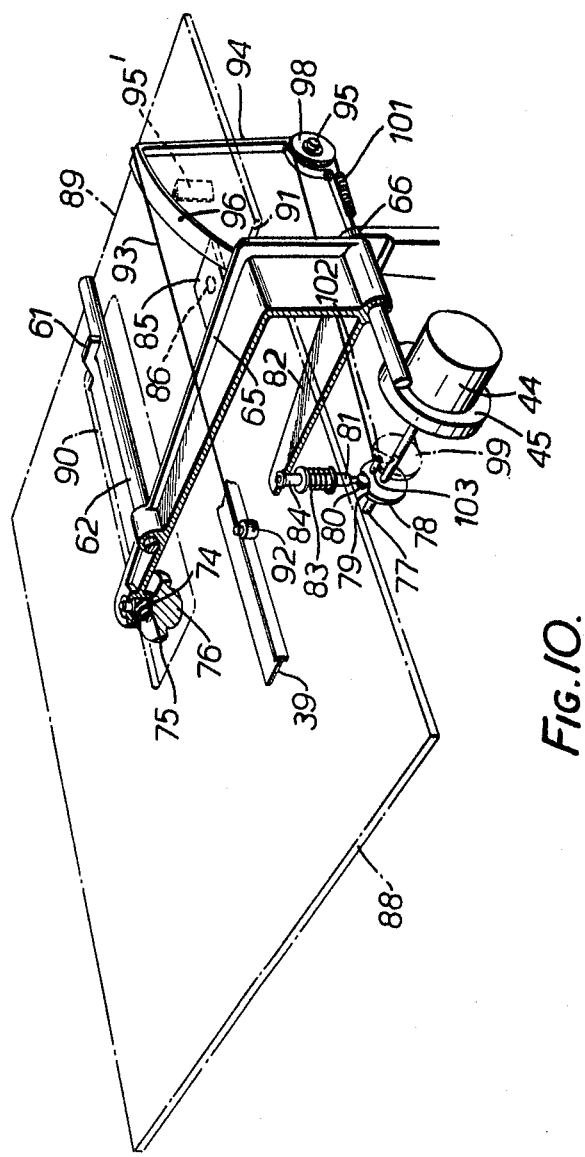
FIG. 10 is a perspective view of a disc changing mechanism of the reader.

FIG. 10 illustrates the drawer mechanism for discs, together with the disc clamping mechanism.

This figure illustrates the member 65 which is pivotally mounted at 66 to walls 67 of the chassis. It also illustrates the rod 62 which engages the underside of projection 61 of the upper member of the reading head. At the free end of member 65 is mounted a rubber bushing 74 carrying at its lower end a disc engaging member 75 having a convex projection 76 which will engage within the hole 4 of the disc and clamp it onto the cup-shaped member 27 shown in FIG. 6.

FIG. 10 also shows the motor 44 which has a shaft 77 on which is mounted a cam 78. Cam 78 has a cut-out 79 to be engaged by a bearing member 80 at the lower end of a vertically, slidably mounted, shaft 81. The shaft 81 is coupled to a limb 82 of member 65 by a spring 83 and a projection 84 of the limb 82. It will be appreciated that when the motor 44 is energised its rotation will be imparted to the cam 78, which will cause the bearing member 80 to ride out of the cut-out 79 and thus lift rod 80 and hence limb 82 and the whole of member 65. The member 65 will be maintained in this lifted position for a major portion of one revolution of the cam 78. When the member 65 lifts, so does a platform 85 attached to the member 65, this member 85 carrying on its lower surface one portion 86 of the moiré fringe transducer utilised to read the angular incremental track 9 of the disc. The other member 87 of the transducer is illustrated in FIG. 6 and is carried by a projection of one of the walls 67.

In the raised position of arm 65, the upper member 50 of the reading head is also raised by way of rod 62, so that the disc is free to be removed and inserted by use of a drawer indicated in dashed lines at 88 in FIG. 10. This drawer has an open end 89 at one end for the insertion of a disc and also incorporates various apertures, two of which are shown at 90 and 91. Aperture 90 enables the optical system of the reading head to apply illumination through a disc when supported by the drawer, and aperture 91 similarly provides for operation of the moiré fringe transducer 86, 87. The drawer at its lower surface carries a plurality of bearing members, one of which is shown at 92 in FIG. 10, these bearing members running on the rails 39, shown in FIGS. 6 and 10. The bearing member 92 shown in FIG. 10 is attached by a cord 93 to a member 94 pivotally mounted at 95 to the chassis 23. The member 94 has an arcuate surface 96 centred on axis 95 so that the cord 93 is retained in a substantially horizontal position in all angular positions of member 94. Member 94 has a projection 95' which will engage a limit switch 97 (FIG. 6) to sense the end position of member 94. Also attached to the member 94 is a pulley 98 which engages a pulley 99 by means of a cord 100 incorporating a spring 101. The pulley 99 is shown in dotted lines in FIG. 10 and is mounted on shaft 77 so that it is free to rotate relative thereto. The rear surface of the pulley 99 incorporates a segmentally-shaped recess 102 within which is positioned the free end of a projection 103 of the cam 78. It will be apparent that when the bearing member 80 is riding on the circular outer periphery of the cam 78, the projection 103 will engage the pulley and cause it to rotate with the motor 44, hence causing rotation of member 94 and consequent sliding of the drawer into and out of the reader.

Figure 11:
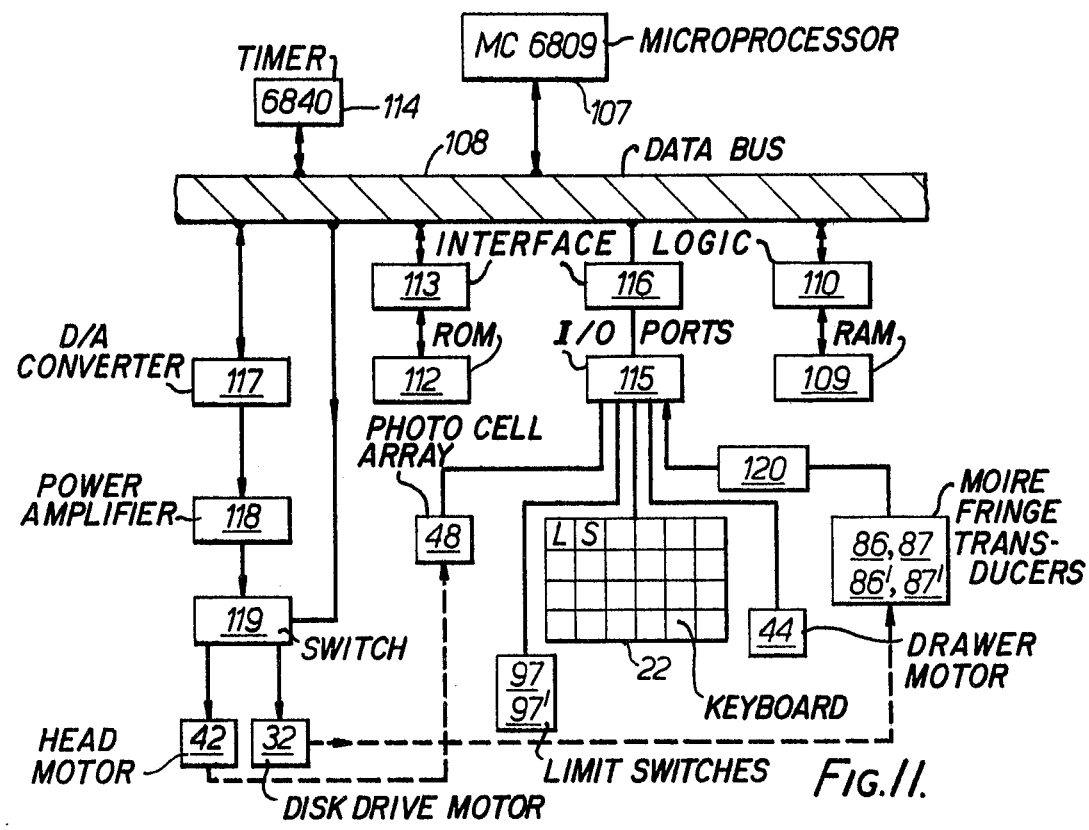
FIG. 11 is a block circuit diagram of a control system of the reader.

FIG. 11 is a schematic circuit diagram of the electronic control system of the reader.

This is based upon an MC6809 microprocessor chip and detailed information on usage can be found, for example, from 'An introduction to Microcomputers', Volume II, Some Real Products by Adam Osborne and Associates. Motorola data sheets also provide detailed instructions. Accordingly FIG. 11 shows only a schematic circuit diagram.

The microprocessor circuit itself is designated 107 in FIG. 11 and is coupled to a system data bus 108. Also coupled to the data bus, via addressing and interface logic 110, is a read/write memory 109. A read only memory 112 is also coupled to the data bus by way of addressing and interface logic 113. A 6840 timer 114 is also coupled to the data bus for the purpose of timing during servo control. Input/output ports 115 are also provided, being coupled to the data bus by interface logic 116. Coupled to the ports 115 are moiré fringe transducers 86, 87 and 86', 87', the keyboard 22 and the photocell array 48. The moiré fringe transducers are coupled to the ports by an up-down 14 counter 120. The motor 44 is also coupled to the input/output ports as are limit switches including limit switches 97 and 97'.

The data bus also communicates with an eight-bit, plus sign bit, digital-to-analog converter 117 controlling a power amplifier 118 which drives motors 32 and 42 via a multiplexer/changeover switch 119.

Motor 32 is shown coupled to the moiré fringe transducers via a dotted line in FIG. 11, this representing the optical coupling via the control data tracks 9 and 11. Similarly the motor 42 is shown coupled by a dotted line to the photocell array (with decoding logic) 48, this representing the data coupling via the optical system shown in FIG. 9.

The operation of the system will now be described.

The memory 112 contains program data which defines the fundamental operation of the reader, including defining functions for keys of the keyboard 22. In FIG. 11 two of these keys are designated L and S.

The operator will initially, having applied power to the system, actuate key L in order to activate motor 44 in the direction causing the drawer to emerge through the aperture 21. The operator will then insert a disc through the open end of that drawer and re-activate key L to operate the motor in the reverse sense to drive the drawer back into the reader and cause the member 65 to be lowered to clamp the disc in position.

On hitting the key S, a starting sequence will be initiated as follows.

Firstly, the reading head will be displaced to its radially outermost position, detected by a limit switch 97' (FIG. 6), whilst the disc is being rotated at constant speed, in order that the system may scan the track 7. In this condition, data from the photocell array, with decoder, 48 will be received by the microprocessor. The width of this array is more than sufficient to encompass the radial width of band 7, so that, within certain limits of eccentricity, the whole of the band can be imaged onto the photocell array. According to the amount of eccentricity at any particular angle, a different set of photocells will have the image of bit sets 17 imaged upon them. The microprocessor will be able to detect which cells, if any, have the guard rails imaged upon them and from this will determine three factors. Firstly, it will determine whether or not both rails are within the range of the array, and, if not, will adjust the radial position of the reading head accordingly. Secondly, it will determine the actual value of eccentricity at that given angular position and will store that value in memory 109. Thirdly, it will be able to ascertain which photocells are in a position corresponding to the positions of the twenty bits of a set 17. These particular photocells will be read by the microprocessor to establish the individual bit values. In particular, if it is ascertained that, say, a known group of eight photocells of the array have a position corresponding to a given bit, then, say, the output from the middle four photocells of that set will be averaged to obtain the bit value. Further angular position measurement can now be effected by way of the transducer 86, 87, because this transducer operates when the reading head is withdrawn away from the track 7.

The next step in the process will be for the disc to be halted at a given angular position corresponding to that in which the reading head is aligned with a given one of the radial tracks 11. The incremental bits in that track are read by a moiré fringe transducer 86', 87' the position of which on the head is shown in FIG. 7. This position is slightly nearer the centre of the disc than the optical axis defined by the lenses 57, accounting for the extension of tracks 11 into central annulus 6. The reading head will be moved radially inwardly under servo control from the track 11 to reach track 8 (or a given one of tracks 8) and will read the sets of data bits contained therein in a serial manner. A first group of characters or words in track 8 will be read into the microprocessor system so that the system may ascertain the type of disc, in particular, whether or not any index track is provided, whether or not any programming track is provided and whether or not there is any "title" or "menu" page to be accessed initially. It is pointed out here that one or more tracks 8 may be provided with program data which defines the manner in which the reader should respond to data indexing information, and such programming information will be read into memory 109 for subsequent use during reading of the disc.

If the data read from the track or tracks 8 defines an initial page to be displayed, the microprocessor will calculate the nearest radial track, drive the disc until the reading head overlies that track and then hold the disc stationary until the reading head has been moved radially to the required radial coordinate for that page. For the present it is noted that when this stage has been reached, the reading head will have been set to image the page to be displayed, so the microprocessor system will have ceased reading data from the photocell array 48, and will have withdrawn the lens 70 to enable that page to be displayed by way of the optical system shown diagrammatically in FIG. 9. The disc will then be rotated under servo control the angular distance necessary to reach a position corresponding to the known angular co-ordinate of that page. Such radial and angular servo control positioning is under control of the transducer 86', 87' and the transducer 86, 87 in conjunction with the motors 42 and 32 and this control will be described in more detail hereinafter. The operator may select further pages by actuating keys on the keyboard.

In one scheme, the individual pages have page numbers running from, say, 1 to 9000 and the operator may input that page number to access the corresponding page. The microprocessor will decode that page number into a corresponding radial co-ordinate value and angular co-ordinate value for page searching in the manner briefly described above.

An alternative method of access is via indexing, and this process will be described hereinafter.

The way in which the servo positioning system operates upon motors 32 and 42 will now be described in more detail.

Firstly it will be apparent that the system must incorporate two servos one for controlling the rotational position of the disc by motor 32 and the other for controlling the radial position of the reading head by motor 42. The only difference between the two servos is the value of the coefficients used by an algorithm within the microprocessor system for calculating motor control voltage. These coefficients will be stored in the memory 112. Motor control data is supplied to the digital-to-analog converter 117 which controls the power amplifier 118 so that it should deliver the desired control voltage with the correct polarity or sign. Radial or angular control is selected by the multiplexer or switch 119.

Because each servo is fundamentally the same, that applicable to controlling angular motion only will be described in detail.

From the information available to the microprocessor, it knows at any one moment the current angular position of the disc and the desired angular position and accordingly knows the distance of angular travel required. If that distance is extremely small, only fine-control is applied, but when that distance is greater than a given value, then the control of position is effected firstly by coarse-control followed by fine-control.

Figure 12:
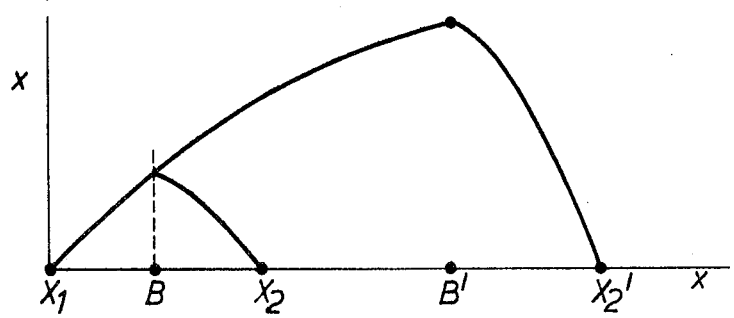
FIG. 12 is a diagram of velocity versus distance to illustrate a control action of the circuit of FIG. 11.

In the coarse-control operation, the timer 114 plays a part in generating an interrupt every 8.9 ms, this time interval being the main sampling period for the servo system. The coarse-control algorithm of the system is in two parts, firstly an acceleration phase in which full motor voltage is applied by the power amplifier, and a deceleration phase in which a deceleration voltage is applied by the power amplifier of such a value as to stop the motor with the disc having reached a "window" around the final target. FIG. 12 shows two typical velocity profiles plotted against distance. The origin is a point $X_1$ designating the starting position and $X_2$ and $X_2'$ represent two alternative finishing positions. In the example shown in FIG. 12 the travel from $X_1$ to $X_2$ is intended to represent the limit of travel for the system for which the motor speed is never large enough for motor back EMF to be significant. In this case, the changeover from acceleration to deceleration occurs at a brake point B which is substantially half way between $X_1$ and $X_2$. Whenever the distance travelled, e.g. to $X_2'$, is greater than $X_2-X_1$, a brake point B' is calculated which is beyond the half way point, and is in particular substantially at a point such that B' $X_2' = BX_2$.

Figure 13:
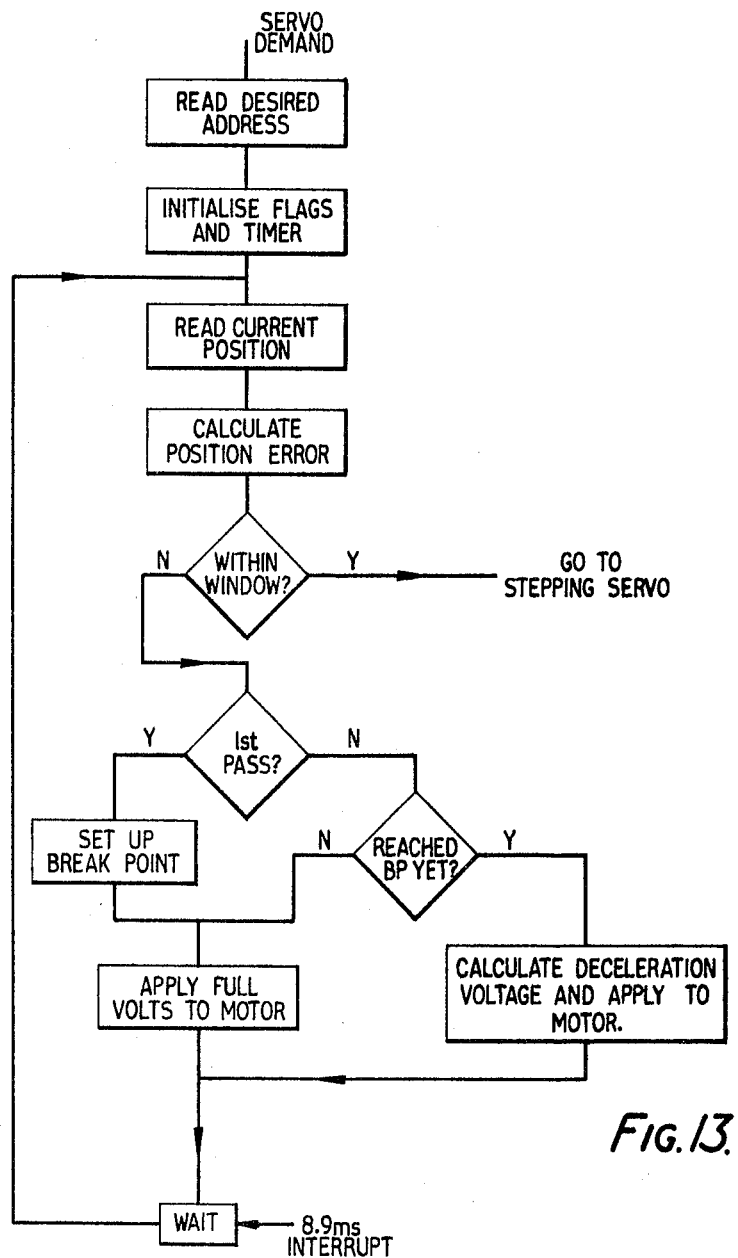
FIG. 13 is a flow chart illustrating a controaction of the circuit of FIG. 11.

Accordingly, the software in memory 112 provides the following series of steps. Initially, the current position is determined and the position error calculated. It is then calculated whether or not the error is within a given "window" and if it is then the software defines fine-control. Otherwise the software calculates the position B or B' corresponding to the error previously calculated and then applies full voltage to the motor. 8.9 milliseconds later, the current position and the position error are re-calculated and it is again determined whether or not the window has been reached. If not, the system ascertains whether the point B or B' has been reached and if it has it proceeds to the deceleration phase. Otherwise, full voltage is maintained on the motor. This process is repeated every 8.9 ms. FIG. 13 is a flow diagram of the process involved.

Eventually the brake point B or B' will be reached and the deceleration phase will commence in which a deceleration voltage to be applied by the power amplifier is calculated every 8.9 milliseconds. The algorithm provided in the system is as follows:

$$V = \frac{K_1 X^2}{2X_e} - K_2 X - K_3$$

In this algorithm the first term represents the required deceleration to stop on target, the second term represents the correction factor due to back EMF and the third factor is a correction to compensate for friction. $X_e$ is the positional error calculated every sampling period, X is a calculated value of velocity corresponding to the change in distance over the sampling period divided by the sampling period, and V is the motor voltage required for deceleration. The sampling period has been chosen in this example to make the most significant coefficient $K_1$ equal to .32 so that only a shift operation is required in the software for the calculation of the first coefficient. An approximate division routine is used in the software for calculating the first term to save microprocessor time. It should also be noted that every 8.9 milliseconds the servo measures the exact value of $X_e$, so that no accumulative errors result from this approximation.

The fine-control is carried out as follows.

Firstly, the distance to be travelled is calculated from the known existing and desired positions. From this data the form of the voltage is calculated on the basis that it should consist of an acceleration pulse followed by a deceleration pulse. The relative amplitudes of these pulses are adjusted to allow for rolling friction and their combined effect is to cause the disc to move one small step.

Step size is determined by the width of the pulses, this width being calculated by the microprocessor from the known position error.

The ultimate resolution is determined by the friction and stiffness of the moving parts. In particular, if the motor performs one very small step, the disc does not move as the drive wheel 28 merely distorts and then springs back when the drive is stopped. Nevertheless, this gives a minimum step size of less than 0.9 minutes of arc, equivalent to 40 μm at the perimeter of the disc.

A further function implemented by the microprocessor is a focussing adjustment to compensate for focussing differences between reading track 7 and tracks 8 at different radii, when the difference in optical path length to array 48 would provide a badly focussed image at array 48 at some radii. As described hereinafter, the disc is supported out of contact with moving parts by an air bearing with an adjustable air pressure. Accordingly, during reading by array 48, the microprocessor adjusts the air pressure according to the radial position of head 49.

An alternative method is to provide a different optical path for array 48. In this case solenoid 73 will put into the path a weakly negative lens and a mirror, the mirror directing light to an arrangement mounted on the chassis and comprising lens 70 and array 48 a fixed distance apart. The negative lens will provide compensation for the variations in distance between it and lenses 57 as the head moves radially.

It has been indicated above that a digital track 8 could be provided so as to contain indexing information. Moreover digital programming information can be stored to provide the reader with software particularly adapted to handle the indexing data that is provided on the same disc. In this way a variety of types of indexes can be made compatible with a single embodiment of disc reader by having the reader effectively reprogrammed in part each time a disc is loaded.

One type of indexing scheme which is suitable in the present context is that using so-called post-co-ordinate indices. This type of index is appropriate to data bases where the information to be retrieved cannot necessarily be described by a single unique route via a hierarchical tree but rather by a logical combination of descriptive parameters or key words. In this scheme the operator is expected to enter the logical combination of key words describing the information required via an alphanumeric logical operator section of the keyboard. The processor then interprets each key word entry and receives from the digital index provided by the disc a list of pages pertinent to those key words. The processor then performs a prescribed logical operation(s) to produce a hit list of pages which conform to the entered logical combination of key words.

The preferred method of implementing such an index is by the use of a controlled vocabulary giving a defined set of allowed key words. Accordingly, the operator is first presented, on the optical display, with a menu page of file names which broadly describe the categories of allowed key words. Such allowed key words might be "AUTHOR", "CHEMICAL COMPOUND" etc. By selecting one of these names from the menu page, the system accesses via the digital data on the disc a corresponding sub-menu list of allowed key words within the selected file name category. Selecting a key word from that list causes the system to retrieve the list of pages pertinent to that key word and deposit them in a user file in the processor memory. The operator may in the alternative specify a boolean combination of the displayed key words with the result that the appropriate list of pages would be selected from the index and entered into the user file. Several user files may be created from key words within different file name categories. Finally the operator can enter a logical combination of some or all user files and produce a hit list as before.

In selecting the choice of either file name or key words, the operator need only key in a number associated with that term as displayed on the menu page on the screen. This enables a simple and cheap numeric keyboard to be used and provides simplified operator operation.

Another type of indexing system which is appropriate to the present reader is a pre-co-ordinate hierarchical index where the operator requires some specific information regarding an item contained in the data base, e.g. the part number of a component of an automobile.

In this system, the operator is presented with the main menu page listing the broad topics covered by the data base, e.g. engine, gear box etc. In selecting one topic, he is presented with another menu page providing a more detailed selection within the chosen topic. This process continues until the final menu page shows the information required by the operator.

Data bases which require only a simple optical hierarchical index require no significant digital information at all to be stored on the disc as the menu pages provided could give absolute page numbers which may be accessed by the operator as already described above.

In large systems, several discs may be required to hold all the 'pages' of a data base and the indexing and programming required may be relatively extensive. In that case, one complete disc may be devoted to indexing and program data so that its zones 10 are entirely made up of digital data tracks 8. Such a disc will be supplied initially to the reader to supply memory 109 with the data it requires for operation with the analog data of the remaining discs.

A final aspect of the reader mentioned briefly above is the focussing system required to adjust the vertical position of the imaged area of the disc relative to the lenses 57. In particular, a system is chosen which makes no contact with the disc, to ensure that there is no damage to the disc during rotation and no drag on the disc such as would increase the load on the disc drive motor 32. In fact, to minimise this load, the disc is supported at its central area 6 only, so that the remainder of the disc can flex by an amount which varies with radius, so making any system of focussing difficult which involves adjustment to the optical system.

An air bearing system attached to the reading head is chosen because it not only supports the disc where it is being imaged without contact, but also allows minor adjustments to be made in air pressure for fine focussing.

Figure 14:
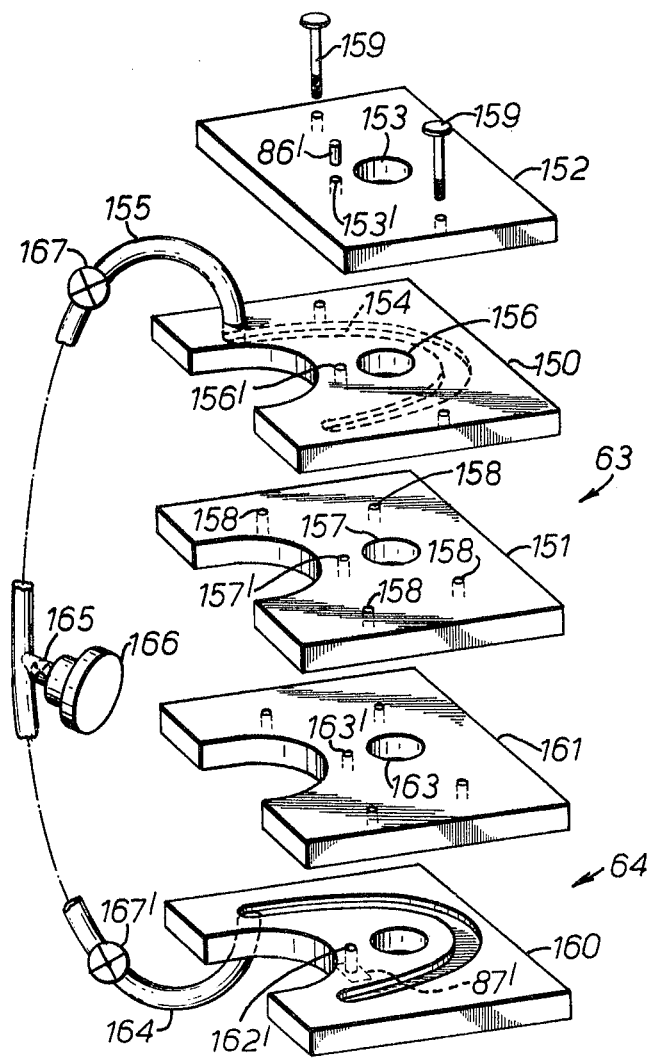
FIG. 14 is an exploded view of an air bearing arrangement of the reader.

One air bearing scheme is illustrated in FIG. 14 as an exploded view.

The upper bearing 63 comprises two plates 150 and 151 attached together and mounted to depend from a plate 152 forming part of the reading head member 50 below mirror 60 and containing aperture 153 for the optical path of the reading head and aperture 153' for passage of light from moiré fringe transducer element 86'.

Plate 150 is an air supply plate containing a groove 154 in its undersurface supplied with compressed air by a flexible tube 155 which runs along and is strapped to member 50 of the reading head. Plate 150 contains apertures 156 and 156' for the optical paths.

Plate 151 is a thrust plate containing apertures 157 and 157' for the optical paths and several through-passages 158 (0.178 mm diameter) which in use open into groove 154 and so provide air jets which set up a layer of pressurised air between the disc and the thrust plate 151.

Threaded bolts 159 pass freely through plate 152 and are threaded into plate 150 to allow the bearing 63 to move vertically relative to plate 152, whilst preventing it from rotating.

The lower air bearing 64 comprises an air supply plate 160 and thrust plate 161 secured together and apertured at 162 and 163 for the optical path and at 162' and 163' for passage of light to transducer element 87'. This bearing is fixedly secured to the lower member 51 of the reading head. Air is supplied to bearing 64 by a flexible tube 164 strapped to the member 51 of the reading head.

Tubes 164 and 155 are coupled by way of an adjustable needle valve 165, by which air may be vented to atmosphere, to an electrically driven compressor unit 166, mounted on the chassis. This compressor unit supplies about 5 lbf/in$^2$ gauge.

The resulting structure provides two thrust pads between which the disc rotates. Air is supplied to the pads at about 0.5 liters/min. causing the disc to hover between the pads with a separation of about 30 microns between the disc and each pad. By adjusting the flow by means of valve 165, the disc, and the upper bearing, can be adjusted in height for fine focussing. Coarse focussing is achieved by mounting the lenses 57 in a tube screw-threaded into tube 56 of the reading head (FIG. 8).

Further needle valves 167 and 167' may be provided for control of relative pressure. Valve 165 is controlled by the microprocessor as described above and all three valves may be manually controllable for fine focussing of optical images.

In an alternative, bearing 63 is fixedly secured to plate 152 and the pressure difference between opposite sides of the disc is controlled for focussing by adjusting one or both of valves 167 and 167'.

As already discussed, thermoplastics discs for the reader described above can be clearly produced in quantity by a stamping or embossing process from a master disc.

Figure 15:
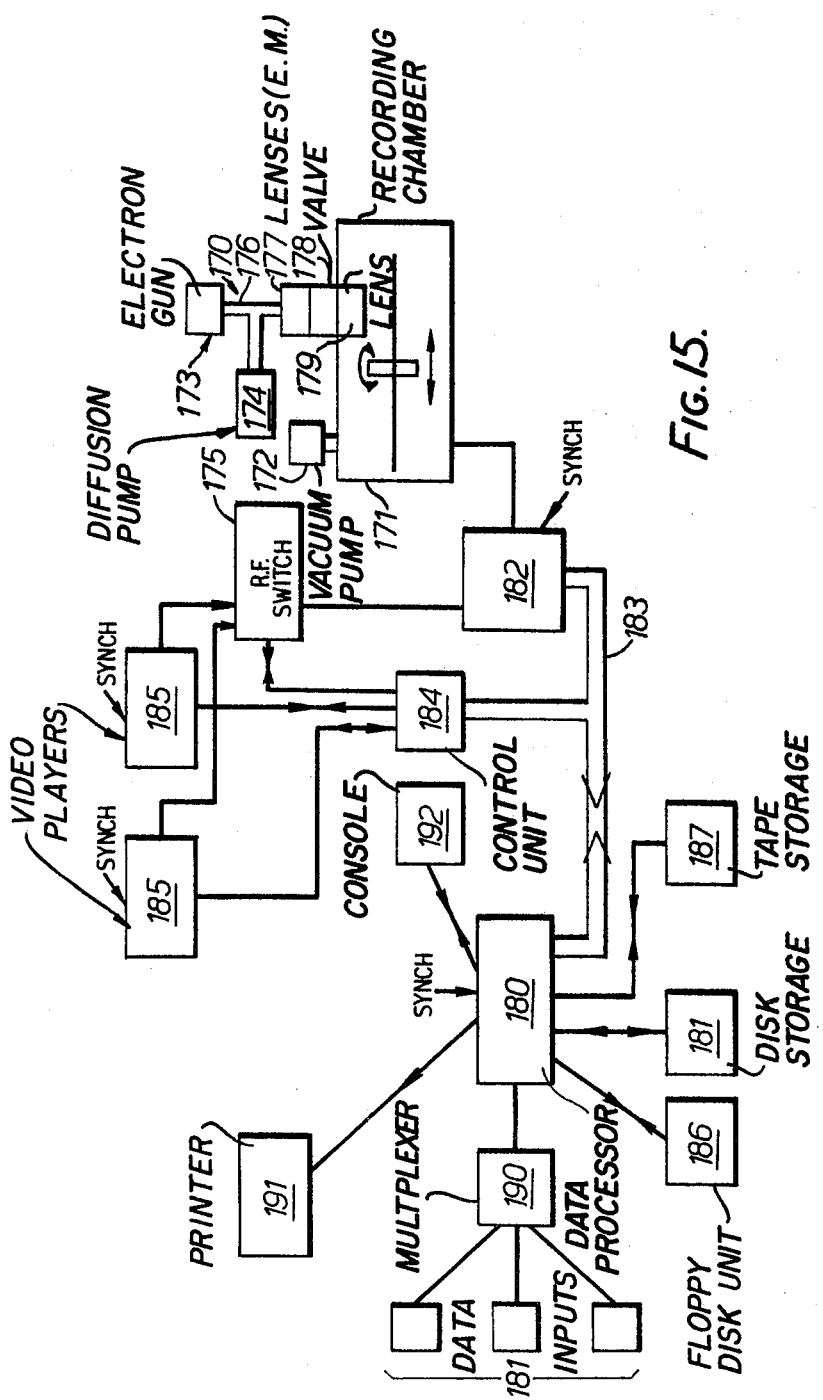
FIG. 15 is a block diagram of a data studio for the production of master discs for the reader.

Master discs are prepared in a studio, a preferred form of which is schematically shown in FIG. 15. Discs utilised in the studio are discs already provided with a carrier-frequency grating by means, for example, of a Neumann lathe. Resist is then applied to the discs, for example by spinning. These discs are then recorded by means of an electron beam recorder 170 provided with beam-blanking so as not to activate areas of resist not to be modulated, e.g. between 'pages' of data. Beam-blanking is achieved in this example, by beam deflection. The recorder comprises a recording chamber 171 with a volume of 225 liters and evacuated to a pressure from $10^{-4}$ to $10^{-3}$ torr during recording by a diffusion pump 172. This working vacuum is also maintained by a diffusion pump 174 connected to the anode section of an electron gun 173 having a lanthanum hexboride cathode.

The gun uses a 1 mm square section $LaB_6$ rod with a tip sharpened to a radius of curvature of 5 microns. Around and close to, but not in contact with, this rod is a tungsten heating coil held at a negative potential relative to the rod. The rod is heated both by radiation and electron bombardment from the tungsten coil.

The sharpened tip is brought close to and concentric with a 0.5 to 1 mm aperture in a tantalum disc Wehnelt grid. This grid could be modulated to control the beam current. This feature is not required since beam modulation is achieved by the use of beam blanking. The grid is therefore operated in an autobias mode to give a controlled and constant beam current. Both tip and grid are maintained at approximately minus twenty kilovolts relative to ground potential.

The anode is at ground potential. It is parallel to and separated by about 2 mm from the grid. The exit beam passes through a 1 mm aperture in the centre of the grid. All electron beam acceleration occurs in the grid-anode region. This region also forms an electrostatic lens, which forms a 'cross-over' or image of the emitting region of the cathode tip in the grid-anode space. For aligning the anode with the optical axis, alignment coils are incorporated in the space in the pumping T-section 176 below the gun 173.

The pumping T-section 176 is the point at which the column pumping is provided, since in this region a high vacuum is required. The components (grid, anode) in this area become fairly warm during operation but since they are constructed primarily of stainless steel, the resultant outgassing can be coped with by the pumping system. Both beam blanking and beam alignment facilities are in this area.

Below section 176 are electromagnetic condenser lenses 177. There are two condenser lenses, which are conventional assymetric equal bore radius electromagnetic lenses. The bore D=20 mm, which is sufficiently large to take a brass bore liner tube. The liner tube passes through both condenser lenses and is vacuum sealed at the top and bottom so that both sets of lens polepieces are in air. The lenses are provided with 200 turn coils which will safely carry up to 5 amps.

Below the lenses 177 is a control section 178 and final lens 179. The control section contains a column isolation valve, and a beam limiting aperture for the final lens. This aperture is fixed in use but means are provided for X and Y shifts to enable the aperture to be accurately centred on the electron optic axis. This is required before precise electron beam scanning aberration compensation can be effective.

Column isolation is by a simple flap valve with an O-ring in its face which seals upwards onto a horizontal surface. The seating piece for the seal has a loose pivot support so that it can find its own place when seating.

The remainder of the system of FIG. 15 relates to the means for the input of data and its formatting into a form suitable for the electron beam recorder.

The system is centred around a Hewlett Packard HP1000F processor 180 combined with hard disc storage facilities 181, printer 191 and console (HP2647) 192. This system provides the necessary processing to achieve the page formatting, electron beam drive and index creation objectives.

High speed data communications between the central processor and an electron beam interface 182 are provided, in the proposed system, by a standard IEEE 488 data bus 183. This bus passes data to the electron beam recorder in the case where the data is originated by the computer. Also it handles the passage of control information between computer and interface 182. Also connected to the bus is an intelligent control unit (HP 2240) 184 which can communicate with the central processor 180 and which provides control signals for two video players 185 (i.e. telecine) and the associated data path switching 175.

The data path between the video players 185 and the recorder 170 is outside the computer system. This ensures that the speed of data transfer between these devices will not be limited by the computer system.

The computer system can take data input from various sources, including a floppy disc drive 186 and a nine track tape drive 187. A local facsimile input 188 is included, and provides a method of entering small quantities of hard copy data independently of the video players. Several VDU's 189 are coupled to the processor by multiplexer 190 for the manual input of data, which may be in the form of text intended to be incorporated onto the optical pages of the disc, or index data.

It is necessary to achieve the transfer of data to the electron beam recorder partitioned into lines and frames and at the correct rate. To this end, the elements of the system associated with data transfer receive their timing references from a set of master synchronising pulses. These pulses are generated centrally and are distributed to the appropriate points in the system, e.g. the processor 180, video players 185 and interface 182.

A mininum data rate of 4M bits per second is intended for this studio. This rate is compatible with electron beam and electron resist technology.

The data base itself may originate in electronic form or as hard copy. In addition, and particularly in the case of a new data base, a substantial amount of index data is involved. The minimum requirement is a data stream of 4M bits/s to be delivered to the recorder, and additionally this data must be split into lines and frames in a manner analogous to a TV signal. The servo requirements at the recorder for disc rotation and translation are such that, in addition, the frames of data must come at regular intervals to ensure the proper placing of microfilm images on the disc.

As a page is approximately 4M bits of information and there may be, say, 4,800 pages per disc, the performance required from a hard copy scanner is such as to make preferable the use of an intermediate medium for the storage of images originating as hard copy, in particular microfilm.

The data preparation process is then as follows. The information provider is supplied with a microfilm camera to accumulate, at his own speed, the optical pages of his data base. These pages are stored sequentially along with a unique frame identification code on a reel of microfilm. Once the hard copy has been converted to film it is in a form which is much easier to handle mechanically. The two telecine machines 185 scan the microfilm at the appropriate rate, i.e. they are used to replay at high speed a film prepared by an information provider.

Much database material already exists in electronic form. This is the case as a result of the increased use of computer controlled phototypesetting and computer output on microfilm.

The physical transfer of computer-originating data can be achieved by means of the nine track computer drive 187. However, there is no guarantee that the data on tape will be in a form which will be compatible with the data studio software. The data studio facilities are able to take coded data and convert it to the raster format required by the recorder. However, transcribing the output of any database into suitable form may in some cases require the writing of special software.

Index data prepared by a user could enter the system by floppy disc or tape, for example.

Figure 16:
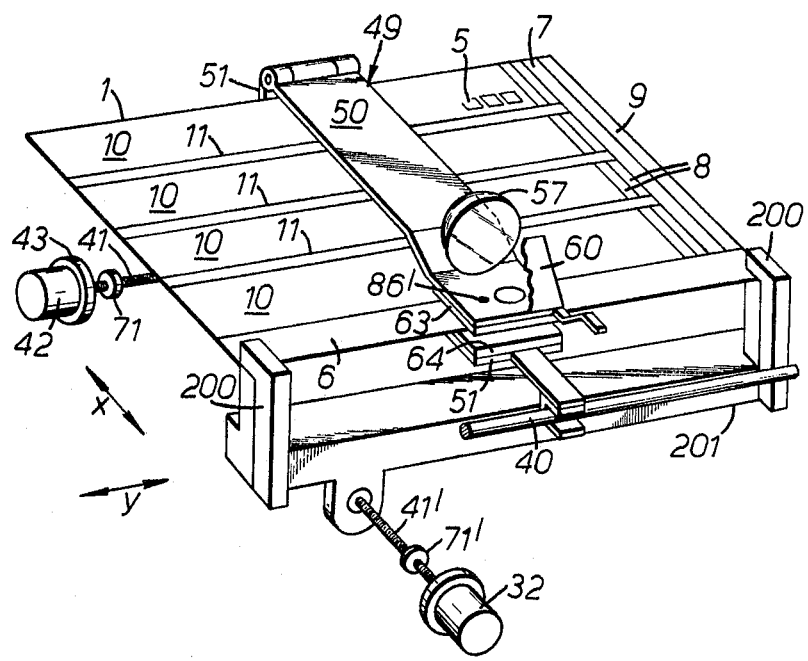
FIG. 16 is a schematic view of a reader for rectangular storage members.

Finally, FIG. 16 illustrates schematically a modification in which an x,y (orthogonal) co-ordinate system is used.

Where elements of FIG. 16 correspond to elements in the embodiment described above, the same reference numerals are used.

In this embodiment, the storage member is a planar, rectangular, sheet 1 having x,y axes, position in the y co-ordinate being given absolutely by digital track 9. Adjacent track 9 are a linear incremental y track 7 and digital data tracks 8. Incremental x-tracks 11 divide the sheet 1 into information storage zones 10 containing 'pages' 5 of analog information or digital tracks of indexing and program data. A strip 6 is left free of data to provide a clamping zone. Strip 6 is releasably clamped at two points by elements 200 carried by a carriage 201 slidably movable in the x direction. Carriage 20' is engaged by lead screw 41' driven, via universal joint 71', by motor 32.

Reading head 49 is precisely as shown in FIGS. 7 and 8, except that no semicircular cut-out is required to accommodate the central support of a disc. Thus, air bearings 63, 64, source 59, mirror 60 and all other items as shown in FIG. 8 are provided. Lead screw 41 again is coupled to motor 42 by universal joint 71 and flywheel 43. Electronic and optical system remain as shown in preceding figures.

Figure 17:
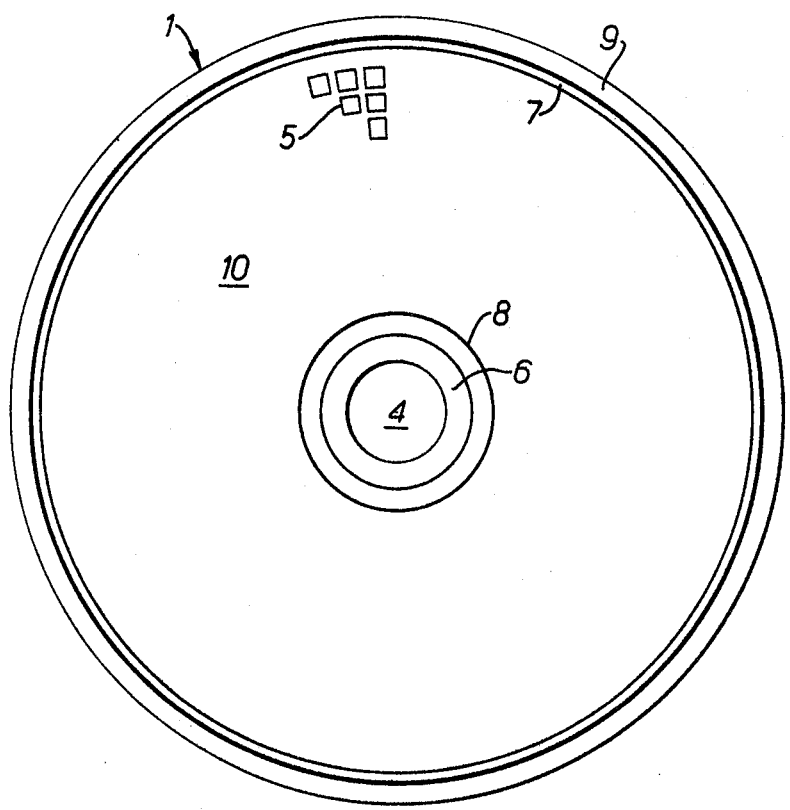
FIG. 17 is a schematic view of a further form of storage member.
Figure 19:
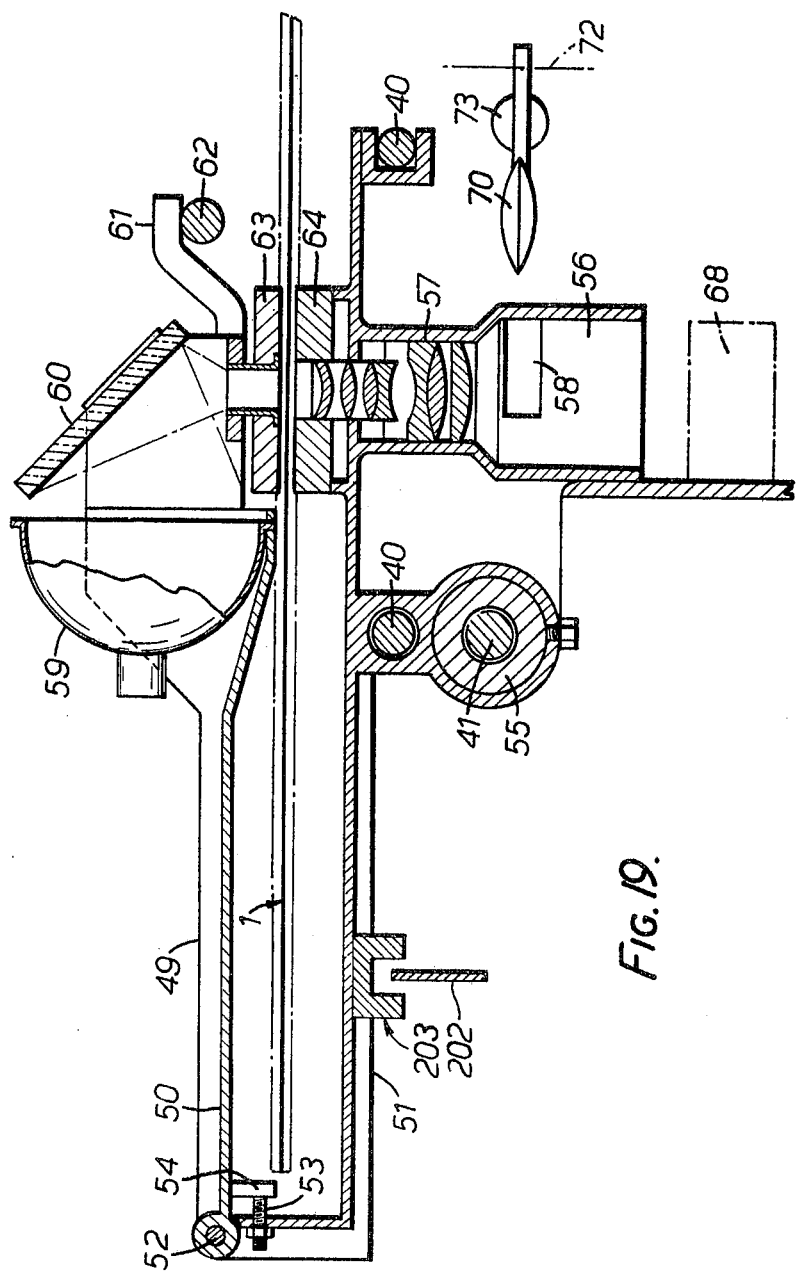
FIG. 19 is a cross-sectional view of the reading head of a modified reader for the member of FIG. 18.

FIGS. 17 to 19 show an alternative embodiment providing additional storage space. In these figures, corresponding parts are given the same references as previously used.

FIG. 17 shows that the major difference in the embodiment of storage member is the omission of radial tracks 11. Otherwise the storage member has the same control data as the previous embodiment.

In this embodiment, radial measurements relative to the datum, defined by one of the annular tracks or rails, is achieved by a linear encoder coupled to the reading head. FIG. 19 shows the encoder to comprise an incremental scale 202 fixed relative to the chassis and a moiré fringe reading head 203 attached to the arm 51 of the optical reading head 49. Furthermore, no moiré fringe transducer is provided on the reading head 49 for reading a radial incremental track.

FIG. 18 shows a control data pattern for the storage member which is the same as that shown in FIG. 3 except: (1) no radial track is provided; and (2) rails 16' and 16" are enlarged to, say, 1 mm width. These rails can then be more easily detected to define the outer and inner limits of the control data zones and provide clear rails for eccentricity measurement. Moreover by measuring the distance between these rails at various angular positions, using encoder 202, 203, one can measure anisotropic error in the disc and use these measurements to compensate for the errors during address calculation. Finally, it is important to note that the mean measurement between these rails 16' and 16" provides a preset reference dimension in the radial direction and so allows for calibration of encoder 202, 203 for each disc, thereby compensating for isotropic errors and differences between discs.

Thus, when a disc is first inserted into the reader, the reading head carries out a scan of these rails and tracks 9 and 8 in order to establish for later use, particularly in actual address calculation and location:

(1) a datum for angular measurement;
(2) a datum for radial measurement;
(3) a reference radial dimension for calibrating the encoder 202,203;
(4) eccentricity at various angles;
(5) anisotropic errors or distortions of the disc; and
(6) data, possibly including computor program routines, defining the type of disc and the manner in which the reader is to process it.

We claim:
1. An optical data storage apparatus comprising:
a planar data storage member having at least one first zone including means for storing pages of alphanumeric or graphical optically readable data, at least one second zone including means spaced from the bulk of the pages included in said first zone for defining absolute positional data in at least one coordinate direction on said storage member, and means on said storage member spaced from the bulk of said pages included in said first zone for providing positional data in the other coordinate direction relative to said pages of information, at least one additional zone on said data storage member including means for storing binary digital information of a significantly different type than the other information stored on said member and including indexing information indicating the location of particular pages of optically readable data;
means for directing non-coherent light at a specific selected page of said stored information on said storage member;

drive means for producing relative motion between the light directing means and the storage member;

input means for selecting information desired by an operator to be displayed;

reading means for reading said indexing information and said positional data;

means for controlling the drive means in dependence upon the data read by the reading means and the signals supplied by said input means to cause the light-directing means and storage member to be positioned relatively to one another to cause light to be directed onto the selected page; and means for displaying the alphanumeric or graphical data on the selected page.

2. A system as defined in claim 1 wherein said storage medium is a disk and wherein said position data is located in circumferential and radial zones on said disk.

3. A system according to claim 1 and including at least one machine readable digital data track additional to the means for defining absolute positional data.

4. A system according to claim 1 wherein the pages are in concentric rings.

5. A system according to claim 1 wherein the pages are arranged along a spiral path.

6. A system according to claim 1 wherein each of a plurality of said pages comprises an analog representation of information.

7. A system according to claim 1 wherein the data in said pages is represented by amplitude modulation of the relief height of a pattern of surface relief variations.

8. A system according to claim 1 wherein the optically readable data includes at least one regular diffraction grating.

9. A system according to claim 8 wherein the diffraction grating has a substantially sinusoidal profile.

10. A system according to claim 8 wherein the grating has a substantially square profile.

11. A system according to claim 1 wherein the second data zone has data elements stored as amplitude modulation of the relief height of a pattern of surface relief variations of the storage member which are optically readable in at least one diffraction order.

12. A system according to claim 11 wherein said elements are stored as data bits each comprising a substantially flat area (100% modulated) surrounded by unmodulated relief variations.

13. A system according to claim 12 wherein said elements are stored as data bits each comprising an area of relief variations surrounded by a substantially flat (100% modulated) area.

14. A system according to claim 1 wherein said storage member is of thermoplastic material.

15. A system according to claim 1 wherein the second zone or zones defines a polar coordinate system of addressing.

16. A planar data storage member comprising:

at least one first zone including means for storing pages of alphanumeric or graphical optically readable data;

at least one second zone including means spaced from the bulk of the pages included in said first zone for defining absolute positional data in at least one coordinate direction on said storage member;

means on said storage member spaced from the bulk of said pages included in said first zone for providing incremental positional data in two coordinate directions relative to said pages of information;

at least one additional zone on said data storage member including digital track means for storing binary digital information of a significantly different type than the other information stored on said member, said additional zone including means for storing information relating to the location of a plurality of said pages in said two coordinate directions; and said storage member being in the form of a disk and wherein the storage on the disk is in the form of a pattern of surface relief variations on the surface of said disk.

17. A member according to claim 16 wherein the digital data track or tracks includes an indexing track comprising indexing data providing addresses of corresponding positions within the page storage zone.

18. A member according to claim 16 wherein the pages are in concentric rings.

19. A member according to claim 16 wherein the pages are arranged along a spiral path.

20. A member according to claim 16 wherein each of a plurality of said pages comprises an analog representation of information.

21. A member according to claim 16 wherein the data in said pages is represented by amplitude modulation of the relief height of a pattern of surface relief variations.

22. A member according to claim 16 wherein the optically readable data includes at least one regular diffraction grating.

23. A member according to claim 22 wherein the diffraction grating has a substantially sinusoidal profile.

24. A member according to claim 22 wherein the grating has a substantially square profile.

25. A storage member according to claim 16 and comprising an indexing, digital data, track separate from the page storage zone and containing indexing data, relating to information in said pages, and associated numeric addresses for said pages in the two coordinate addressing system.

26. A member according to claim 16 wherein the second data zone has data elements stored as amplitude modulation of the relief height of a pattern of surface relief variations of the storage member which are optically readable in at least one diffraction order.

27. A member according to claim 26 wherein said elements are stored as data bits each comprising a substantially flat area (100% modulated) surrounded by unmodulated relief variations.

28. A member according to claim 26 wherein said elements are stored as data bits each comprising an area of relief variations surrounded by a substantially flat (100% modulated) area.

29. A member according to claim 16 wherein said storage member is of thermoplastic material.

30. A member according to claim 16 wherein the second zone or zones define a polar coordinate system of addressing.

31. A data storage member as defined in claim 16 further including peripheral ring means for use in determining concentricity or eccentricity of said disks, whereby any needed address correction may be provided.

32. An optical data storage system comprising:

a planar data storage member having at least one first zone including means for storing pages of alphanumeric or graphical optically readable data, at least one second zone including means spaced from the bulk of the pages included in said first zone for defining absolute positional data in optical or magnetic form in at least one coordinate direction on said storage member, and means on said storage member spaced from the bulk of said pages included in said first zone for providing positional data in the other coordinate direction relative to said pages of information, at least one additional zone on said data storage member including means for storing binary digital information of a significantly different type than the other information stored on said member;

means for directing non-coherent light at a specific selected page of said stored information on said storage member;

drive means for producing relative motion between the light-directing means and the storage member;

input means for inputting data defining a desired page of said first zone;

optical or magnetic reading means for reading said positional data and for reading the information from said additional zone;

a microprocessor, with random access memory, operable in accordance with said information read from said additional zone and arranged to control the drive means in dependence upon the additional data read by the reading means and the desired page defining data to cause the light-directing means and storage member to be positioned relative to one another to cause light to be directed onto the selected page; and means for displaying the selected page.

33. An optical data storage system as defined in claim 32 wherein page indexing binary information is stored in said additional zone on said data storage member.

34. An optical data storage system as defined in claim 32 wherein said system includes means for reading and processing the binary information stored in said additional zone.

35. A system according to claim 32 wherein the pages are in concentric rings.

36. A system according to claim 32 wherein the pages are arranged along a spiral path.

37. A system according to claim 32 wherein each of a plurality of said pages comprises an analog representation of information.

38. A system according to claim 32 wherein the data in said pages is represented by amplitude modulation of the relief height of a pattern of surface relief variations.

39. A system according to claim 32 wherein the optically readable data includes at least one regular diffraction grating.

40. A system according to claim 39, wherein the diffraction grating has a substantially sinusoidal profile.

41. A system according to claim 39, wherein the grating has a substantially square profile.

42. A storage system according to claim 32 and including an indexing digital data track separate from the page storage zone and containing indexing data, relating to information in said pages, and associated numeric addresses for said pages in the two coordinate addressing system.

43. A system according to claim 32 wherein the second data zone has data elements stored as amplitude modulation of the relief height of a pattern of surface relief variations of the storage member which are optically readable in at least one diffraction order.

44. A system according to claim 43, wherein said elements are stored as data bits each comprising a substantially flat area (100% modulated) surrounded by unmodulated relief variations.

45. A system according to claim 43, wherein said elements are stored as data bits each comprising an area of relief variations surrounded by a substantially flat (100% modulated) area.

46. A system according to claim 32 wherein said storage member is of thermoplastic material.

47. A system according to claim 32, wherein the second zone or zones defines a polar coordinate system of addressing.

48. A system as defined in claim 32 wherein said storage medium is a disk and wherein said position data is located in circumferential and radial zones on said disk.

49. A planar data storage member comprising:
at least one first zone including means for storing pages of alphanumeric or graphical optically readable data; said pages being stored in accordance with a two coordinate addressing system;

at least one second zone including means spaced from the bulk of the pages included in said first zone for defining absolute positional data in optical or magnetic form in at least one coordinate direction on said storage member;

means on said storage member spaced from the bulk of said pages included in said first zone for providing incremental positional data in said one coordinate direction relative to said pages of information; and at least one additional zone on said data storage member including digital track means for storing binary digital information of a significantly different type than the other information stored on said member, said additional zone including means for storing information relating to the location of a plurality of said pages in said two coordinate addressing systems.

50. A data storage member as defined in claim 48 wherein said storage member is disk shaped, and further including peripheral ring means for use in determining concentricity or eccentricity of said disks, whereby any needed address correction may be provided.

51. An optical data storage system comprising:
a planar data storage member having at least one first zone including means for storing pages of alphanumeric or graphical optically readable data, at least one second zone including means spaced from the bulk of the pages included in said first zone for defining absolute positional data in optical or magnetic form in at least one coordinate direction on said storage member, and means included in said system and spaced from the bulk of said pages included in said first zone for providing positional data in the other coordinate direction relative to said pages of information, at least one additional zone on said data storage member including means for storing binary digital information of a significantly different type than the other information stored on said member;

means for directing non-coherent light at a specific selected page area of said storage member;

drive means for producing relative motion between the light-directing means and the storage member;

input means for inputting data defining a desired page area of said first zone;

optical or magnetic reading means for reading said positional data and for reading the information from said additional zone;

a microprocessor, with random access memory, operable in accordance with said information read from said additional zone and arranged to control the drive means in dependence upon the additional data read by the reading means and the desired page defining data to cause the light-directing means and storage member to be positioned relative to one another to cause light to be directed onto the selected page area; and means for forming an image relative to the selected page.

52. A system for processing data at areas of an optical data storage member, comprising:

a storage member comprising a storage zone containing the areas for pages of alphanumeric or graphical information to be processed, having means spaced away from the areas for the bulk of said pages, defining positional data for a two-coordinate addressing systam for the areas, and additional storage means for storing indexing information relative to the location of particular pages of alphanumeric or graphical information;

means for supporting a storage member in a position for processing;

means for producing relative motion between the supporting and processing means and a storage member substantially in each coordinate direction of the storage member;

means for supplying desired values for the first and second coordinates of a page area to be processed;

means for detecting said positional data and for measuring said relative motion relative to said data in the first and second coordinate directions to obtain actual value data in said coordinate system, the measuring means comprising means for reading incremental positional data in one coordinate direction and means for reading incremental relative-positional data in the other coordinate direction;

means for associating data at said additional storage zone means with the location of particular pages as defined in said two coordinate addressing system; and means for accomplishing the processing step including forming an image of the desired selected page at the desired and selected page area.

* * * * *